(12) United States Patent
Ando et al.

(10) Patent No.: US 8,649,095 B2
(45) Date of Patent: Feb. 11, 2014

(54) DIFFRACTION GRATING LENS AND METHOD OF PRODUCING THE SAME, AND IMAGING DEVICE IN WHICH THE SAME IS USED

(75) Inventors: Takamasa Ando, Osaka (JP); Tsuguhiro Korenaga, Osaka (JP)

(73) Assignee: Panasonic Corporation, Osaka (JP)

(*) Notice: Subject to any disclaimer, the term of this patent is extended or adjusted under 35 U.S.C. 154(b) by 159 days.

(21) Appl. No.: 13/143,928

(22) PCT Filed: Dec. 28, 2010

(86) PCT No.: PCT/JP2010/007601
§ 371 (c)(1),
(2), (4) Date: Jul. 9, 2011

(87) PCT Pub. No.: WO2011/086654
PCT Pub. Date: Jul. 21, 2011

(65) Prior Publication Data
US 2012/0243096 A1  Sep. 27, 2012

(30) Foreign Application Priority Data
Jan. 13, 2010 (JP) ................................. 2010-004710

(51) Int. Cl.
*G02B 27/44* (2006.01)
*G02B 3/08* (2006.01)

(52) U.S. Cl.
USPC .......................................... 359/565; 359/742

(58) Field of Classification Search
USPC ......... 359/570, 574, 575, 576, 742, 743, 565, 359/566, 569, 571, 741
See application file for complete search history.

(56) References Cited

U.S. PATENT DOCUMENTS

| | | | | |
|---|---|---|---|---|
| 3,385,184 A | * | 5/1968 | Epstein et al. | 396/546 |
| 5,120,120 A | * | 6/1992 | Cohen | 351/159.49 |
| 5,847,877 A | | 12/1998 | Imamura et al. | |
| 6,473,232 B2 | | 10/2002 | Ogawa | |
| 2005/0078374 A1 | | 4/2005 | Taira et al. | |

(Continued)

FOREIGN PATENT DOCUMENTS

| | | |
|---|---|---|
| JP | 09-127321 A | 5/1997 |
| JP | 2001-324674 | 11/2001 |

(Continued)

OTHER PUBLICATIONS

Notice of Reasons for Rejection, corresponding Japanese Application No. 2011-529391, issued Oct. 25, 2011, English language translation.

(Continued)

*Primary Examiner* — Jie Lei
(74) *Attorney, Agent, or Firm* — Renner, Otto, Boisselle & Sklar, LLP

(57) ABSTRACT

A diffraction grating lens according to the present invention includes a lens body and a diffraction grating provided on the surface of the lens body, the diffraction grating including a plurality of annular zones having slopes inclined along a width direction and a plurality of step surfaces respectively located between the plurality of annular zones. At least one of the plurality of annular zones is light-transmissive across its entire area along the width direction, and in the at least one annular zone, a light transmittance near at least one of two ends along the width direction is smaller than a light transmittance near a central portion along the width direction.

11 Claims, 17 Drawing Sheets

(56) References Cited

U.S. PATENT DOCUMENTS

2007/0091472 A1* 4/2007 Alkemper et al. ............ 359/796
2009/0225215 A1* 9/2009 Korenaga et al. ............ 348/340
2010/0110548 A1* 5/2010 Korenaga et al. ............ 359/571

FOREIGN PATENT DOCUMENTS

| JP | 2002-048906 A | | 2/2002 |
|----|---------------|---|--------|
| JP | 2005-115176 A | | 4/2005 |
| JP | 2006-162822 A | | 6/2006 |
| JP | 2006162822 A | * | 6/2006 |
| WO | 2009/098846 A1 | | 8/2009 |
| WO | WO 2009098846 A1 | * | 8/2009 |

OTHER PUBLICATIONS

International Search Report for corresponding International Application No. PCT/JP2010/007601 mailed Feb. 15, 2011.
Form PCT/ISA/237 for International Application No. PCT/JP2010/007601 dated Feb. 15, 2011 and Partial English translation.

* cited by examiner (a) ASPHERICAL BASE SHAPE (b) PHASE FUNCTION (c) SHAPE OF DIFFRACTION GRATING PLANE (ASPHERICAL BASE SHAPE + PHASE FUNCTION)

(a)　　　　　　　　　(b)

DIFFRACTION GRATING LENS AND METHOD OF PRODUCING THE SAME, AND IMAGING DEVICE IN WHICH THE SAME IS USED

TECHNICAL FIELD

The present invention relates to: a diffractive optical lens (diffractive optical element) which effects convergence or divergence of light by utilizing a diffraction phenomenon; a method of producing the same; and an imaging device in which the same is used.

BACKGROUND ART

A diffractive optical element which has a diffraction grating provided on a lens body and which effects convergence or divergence of light by utilizing a diffraction phenomenon is called a diffraction grating lens. It is widely known that a diffraction grating lens is good for correcting for lens aberrations such as curvature of field or chromatic aberration (a shift in an image point depending on wavelength). This is because a diffraction grating may have an opposite dispersion (inverse dispersion) to a dispersion which is caused by the optical material, or have a dispersion (anomalous dispersion) deviating from the linearity of dispersion of the optical material. Therefore, when combined with usual optical elements, a diffraction grating lens exhibits a great ability of correcting for chromatic aberration.

Moreover, when a diffraction grating is used for an optical system for imaging purposes, the same performance can be attained with fewer lenses than is possible with an optical system for imaging purposes that is composed only of aspherical lenses. This provides an advantage in that the production cost for the optical system for imaging purposes can be reduced and that the optical length can be shortened, thus realizing a low profile.

With reference to FIGS. 21(a) to (c), a conventional method for designing the shape of a diffraction grating lens will be described. A diffraction grating lens is mainly designed by a phase function method or a high-refractive-index method. Herein, a designing method based on the phase function method will be described. The end result will also be the same when the high-refractive-index method is used for designing.

The shape of a diffraction grating lens is formed from the base shape of a lens body on which the diffraction grating is provided, as well as from the shape of the diffraction grating. FIG. 21(a) shows an example in the case where the surface configuration of the lens body is an aspherical shape Sb, whereas FIG. 21(b) shows an example shape Sp1 of the diffraction grating. The diffraction grating shape Sp1 shown in FIG. 21(b) is determined by a phase function. The phase function is expressed by eq. (1) below.

[math. 1]

$$\phi(r) = \frac{2\pi}{\lambda_0}\psi(r) \qquad (1)$$

$$\psi(r) = a_1 r + a_2 r^2 + a_3 r^3 + a_4 r^4 + a_5 r^5 + a_6 r^6 + \ldots + a_i r^i$$

$$(r^2 = x^2 + y^2)$$

Herein, $\phi(r)$ is a phase function; $\Psi(r)$ is an optical path difference function; r is a distance from the optical axis along a radial direction; $\lambda_0$ is a design wavelength; and a1, a2, a3, a4, a5, a6, . . . , ai are coefficients.

In the case of a diffraction grating which utilizes first-order diffracted light, an annular zone is provided at every point where the phase from a reference point (center) reaches $2\pi$ in the phase function $\phi(r)$, as shown in FIG. 21(b). The shape Sbp1 of the diffraction grating plane shown in FIG. 21(c) is determined by adding the shape Sp1, which is based on the curve of the phase difference function being cut up every $2\pi$, to the aspherical shape Sb of FIG. 21(a). Specifically, the value of the phase function of FIG. 21(b) is translated into an optical path length so that the step surface height of each annular zone equals d that satisfies eq. (2) below, and this is added to the surface configuration Sb of the lens body shown in FIG. 21(a).

[math. 2]

$$d = \frac{m \cdot \lambda}{n_1(\lambda) - 1} \qquad (2)$$

Herein, m is a design order (m=1 in the case of first-order diffracted light); $\lambda$ is a wavelength used; d is a step surface height of the diffraction grating; and $n1(\lambda)$ is the refractive index of a lens material which composes the lens body at the used wavelength $\lambda$. The refractive index of the lens material has wavelength dependence, and is a function of wavelength. In any diffraction grating that satisfies eq. (2), the phase difference at steps between annular zones is $2\pi$, and the diffraction efficiency of first-order diffracted light relative to light of the used wavelength (hereinafter referred to as "first-order diffraction efficiency") can be made approximately 100%. According to eq. (2), when the wavelength $\lambda$ changes, the value of d that makes the diffraction efficiency 100% will also change. Conversely, if the d value is fixed, the diffraction efficiency will not be 100% at any wavelength other than the wavelength $\lambda$ that satisfies eq. (2).

However, in the case where a diffraction grating lens is used for generic imaging purposes, there is a need to diffract light in a broad wavelength band (e.g., a visible light region spanning wavelengths of about 400 nm to 700 nm). Consequently, as shown in FIG. 22, when a visible light beam 223 enters a diffraction grating lens having a diffraction grating 222 provided on a lens body 221, not only first-order diffracted light 225 which is ascribable to light of the wavelength that is selected as the used wavelength $\lambda$, but also diffracted light 226 of orders that are unwanted (hereinafter also referred to as "diffracted light of unwanted orders") occurs. For example, if the wavelength which determines the step surface height d is a wavelength of green (e.g., 540 nm), then the first-order diffraction efficiency at the green wavelength will be 100%, so that no diffracted light 226 of unwanted orders will occur at the green wavelength; however, the first-order diffraction efficiency will not be 100% at a red wavelength (e.g., 640 nm) or a blue wavelength (e.g., 440 nm), so that $0^{th}$ order diffracted light of red or second-order diffracted light of blue will occur. These $0^{th}$ order diffracted light of red and second-order diffracted light of blue are the diffracted light 226 of unwanted orders, which will spread across the image plane in the form of a flare or ghost, thus deteriorating the image or degrading the modulation transfer function (MTF) characteristics.

As shown in FIG. 23, Patent Document 1 discloses providing an optical adjustment film 231 which is composed of an optical material having a different refractive index and a different refractive index dispersion from those of the lens body, on the surface of a lens body 221 having a diffraction grating 222 formed thereon. Patent Document 1 discloses that, by prescribing specific conditions for the refractive index of the lens body 221 having the diffraction grating 222 formed thereon and the refractive index of the optical adjustment film 231 formed so as to cover the diffraction grating 222, it is possible to reduce the wavelength dependence of diffraction efficiency, reduce diffracted light of unwanted orders, and suppress flare due to diffracted light of unwanted orders.

Patent Document 2 discloses, in order to prevent reflected light from step surfaces 232 of a diffraction grating from becoming flare light as it is transmitted through a blazed surface, providing light absorbing portions near the feet of the slopes of annular zones to allow reflected light from the step surfaces to be shaded by the light absorbing portions.

CITATION LIST

Patent Literature

[Patent Document 1] Japanese Laid-Open Patent Publication No. 09-127321
[Patent Document 2] Japanese Laid-Open Patent Publication No. 2006-162822

SUMMARY OF INVENTION

Technical Problem

The inventors have found that, in the case where the pitch of annular zones on the diffraction grating plane of a diffraction grating lens is made small, or an image of a subject with a very large light intensity is taken, stripe flare light which is distinct from the aforementioned diffracted light 226 of unwanted orders occurs. It is not known that such stripe flare light occurs in diffraction grating lenses. Moreover, it has been found by the inventors that, under certain conditions, stripe flare light may greatly deteriorate the quality of an image which has been taken.

The present invention has been made in order to solve such problems, and an objective thereof is to provide a diffraction grating lens which can suppress occurrence of stripe flare light, and an imaging device in which the same is used.

Solution to Problem

A diffraction grating lens according to the present invention comprises: a lens body; and a diffraction grating provided on a surface of the lens body, the diffraction grating including a plurality of annular zones having slopes inclined along a width direction and a plurality of step surfaces respectively located between the plurality of annular zones, wherein at least one of the plurality of annular zones is light-transmissive across an entire area thereof along a width direction, and in the at least one annular zone, a light transmittance near at least one of two ends along the width direction is smaller than a light transmittance near a central portion along the width direction.

An imaging device according to the present invention comprises: the aforementioned diffraction grating lens; and an imaging element for capturing a subject image which is formed by the diffraction grating lens and converting the subject image into an electrical signal.

A method of producing a diffraction grating lens according to the present invention is a method of producing a diffraction grating lens having a lens body, and a diffraction grating provided on a surface of the lens body, the diffraction grating including a plurality of annular zones having slopes inclined along a width direction and a plurality of step surfaces respectively located between the plurality of annular zones, wherein at least one of the plurality of annular zones is light-transmissive across an entire area thereof along a width direction, and in the at least one annular zone, a light transmittance near at least one of two ends along the width direction is smaller than a light transmittance near a central portion along the width direction, the method comprising: a step of proving a lens body having the diffraction grating on a surface thereof; and a step of pressing a mold against the diffraction grating on the surface of the lens body, with a material having a lower light transmittance than that of the lens body being applied on the mold.

Advantageous Effects of Invention

According to the present invention, light transmitted near at least one of both ends along the width direction of an annular zone has its light intensity reduced relative to the light traveling through a central portion along the width direction, whereby the contour of the wavefront of the light transmitted through the annular zone is blurred. As a result, a diffraction phenomenon occurring due to the travel through the annular zone becomes less conspicuous, thus suppressing occurrence of stripe flare light.

BRIEF DESCRIPTION OF DRAWINGS

FIG. 1 is a cross-sectional view of a diffraction grating lens according to Embodiment 1 of the present invention.

FIG. 2 is a partially enlarged diagram of a diffraction grating lens according to Embodiment 1 of the present invention.

FIG. 3 is a diagram showing annular zones which are the subject of a simulation according to Embodiment 1 of the present invention.

FIG. 8 is a diagram showing annular zones which are the subject of a simulation according to Embodiment 1 of the present invention.

FIG. 15 is a cross-sectional view of the diffraction grating lens according to Embodiment 2 of the present invention.

FIG. 16 is a partially enlarged diagram of the diffraction grating lens according to Embodiment 2 of the present invention.

FIG. 17 is a diagram describing the construction of the imaging device Embodiment 3 according to the present invention.

FIG. 19 is a diagram describing another method of producing a diffraction grating lens according to the present invention.

DESCRIPTION OF EMBODIMENTS

First, stripe flare light caused by a diffraction grating lens, as revealed by the inventors, will be described.

Figure 24:
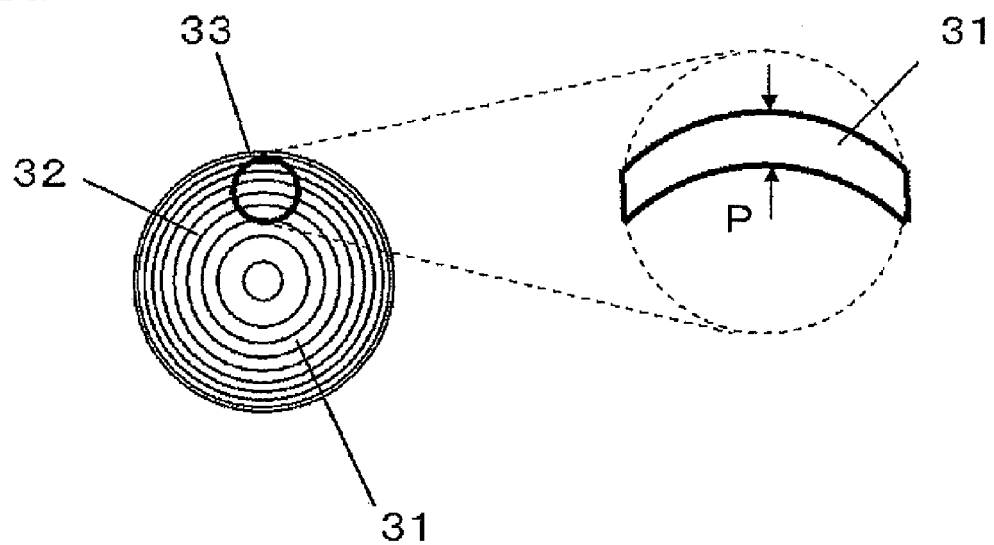
[FIG. 24] FIG. 24 A diagram showing annular zones of a conventional diffraction grating lens as seen from the optical axis direction.
Figure 25:
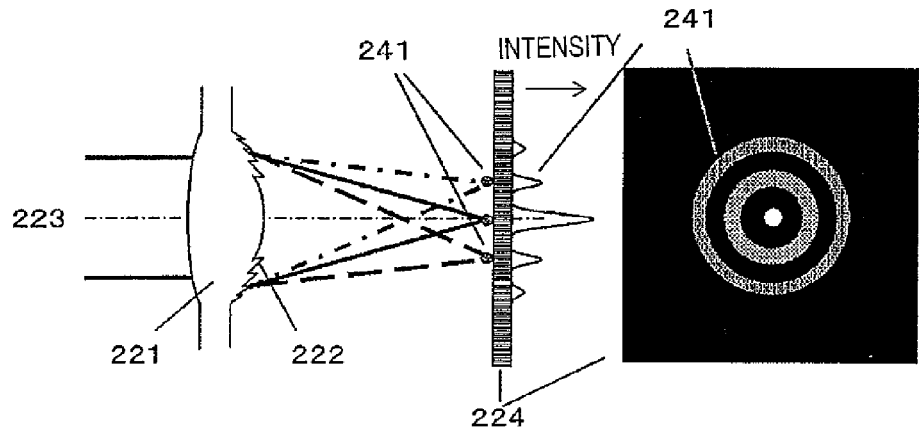
[FIG. 25] FIG. 25 A diagram describing how stripe flare light may occur in a conventional diffraction grating lens.

As shown in FIG. 24, in a diffraction grating lens having a diffraction grating 32 provided thereon, each annular zone 31 is interposed between step surfaces that are disposed in concentric circles. As a result, the wavefront of light which is transmitted through two adjoining annular zones 31 is divided by the step surface between the annular zones 31. Light which is transmitted through each annular zone 31 can be regarded as light traveling through a slit having the width of the annular zone 31 (pitch p of the diffractive annular zones). Generally speaking, aberration can be well corrected by reducing the pitch p of diffractive annular zones. However, when the annular zones 31 decrease in width, light which is transmitted through a diffraction grating lens can be regarded as light traveling through very narrow-width slits which are disposed in concentric circles, and a phenomenon of bending-around of the light wavefront will be observed near the step surfaces. FIG. 25 schematically shows how light may enter a lens body 221 having a diffraction grating 222 provided thereon and the outgoing light may be diffracted by the diffraction grating 222.

Generally speaking, light traveling through a slit having a very narrow width P forms a diffraction pattern at a point of observation at infinity. This is called Fraunhofer diffraction. This diffraction phenomenon also occurs at a finite distance (e.g., the focal plane) when a lens system having a positive focal length is included.

Figure 26:
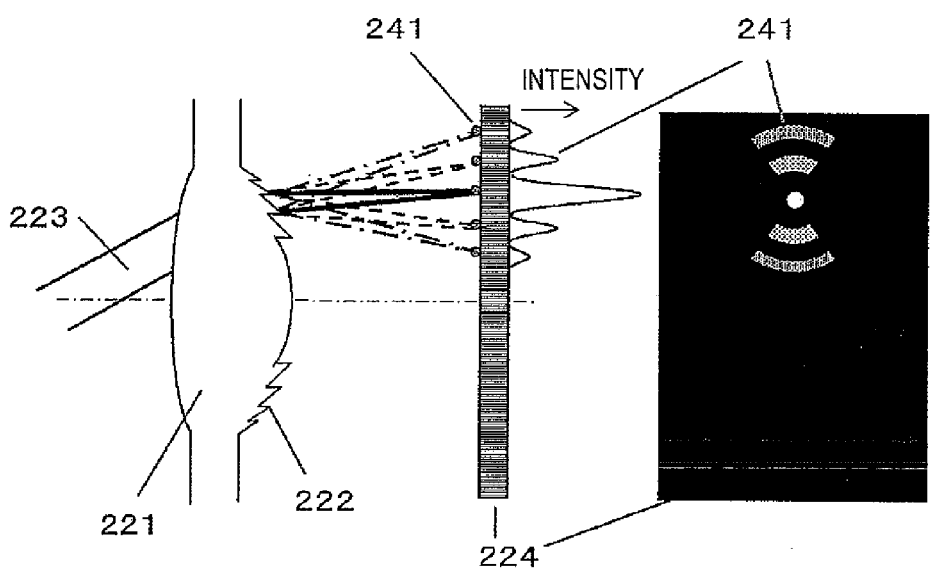
[FIG. 26] FIG. 26 A diagram describing how stripe flare light may occur in a conventional diffraction grating lens.

The inventors have confirmed through image evaluations with an actual lens that, when the annular zones 31 decrease in width, light transmitted through each annular zone mutually interferes, thus resulting in stripe flare 241 spreading in concentric circles as shown in FIG. 25. It has also been confirmed through image evaluations with an actual lens that, as for light entering obliquely with reference to the optical axis, stripe flare 241 in the form of spread wings of a butterfly occur as shown in FIG. 26.

Such stripe flare appears conspicuously when imaging optics are entered by light having an even greater light intensity than that of incident light which is conventionally known to cause diffracted light of unwanted orders. Moreover, detailed studies of the inventors have revealed that, while diffracted light of unwanted orders does not occur at certain wavelengths, stripe flare light occurs across the entire wavelength band used, including the design wavelength.

Such stripe flare will spread over an image even to a greater extent than diffracted light of unwanted orders, thus deteriorating the image quality. Especially, in an imaging environment with a large contrast ratio, for example, when imaging a bright subject, e.g., a light, against a pitch-dark background as in the night, stripe flare light will be particularly conspicuous and therefore problematic. Moreover, stripe flare light will occur with pronounced stripes of bright and dark, and therefore be more conspicuous on the image than diffracted light of unwanted orders, thus presenting a large problem.

Figure 27:
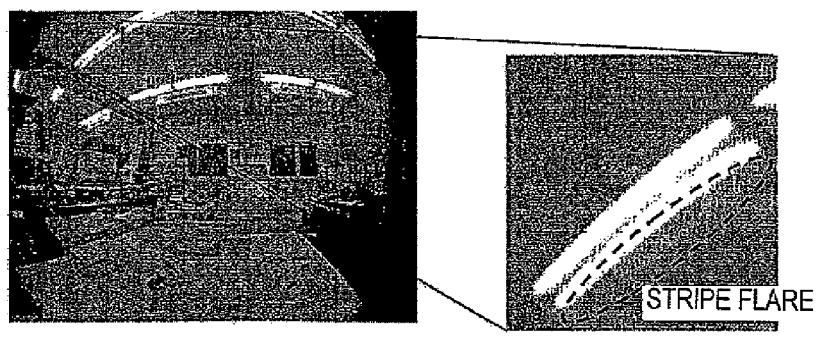
[FIG. 27] (a) and (b) are diagrams showing an exemplary image which is taken by using an imaging device having a conventional diffraction grating lens.

FIG. 27(a) shows an example of an image which is taken by using an imaging device having a conventional diffraction grating lens. The image shown in FIG. 27(a) is an image which captures the inside of a room where fluorescent lamps are lit. FIG. 27(b) shows enlarged the neighborhood of some fluorescent lamps within the image shown in FIG. 27(a). In FIG. 27(b), a bright image in the neighborhood below the fluorescent lamps is a flare stripe.

The inventors have conceived of a diffraction grating lens having a novel structure capable of suppressing such stripe flare light, a method of producing the same, and an imaging device in which the same is used. Hereinafter, with reference to the drawings, embodiments of the diffraction grating lens according to the present invention, the method of producing the same, and the imaging device in which the same is used will be described.

(Embodiment 1)

Figure 1:
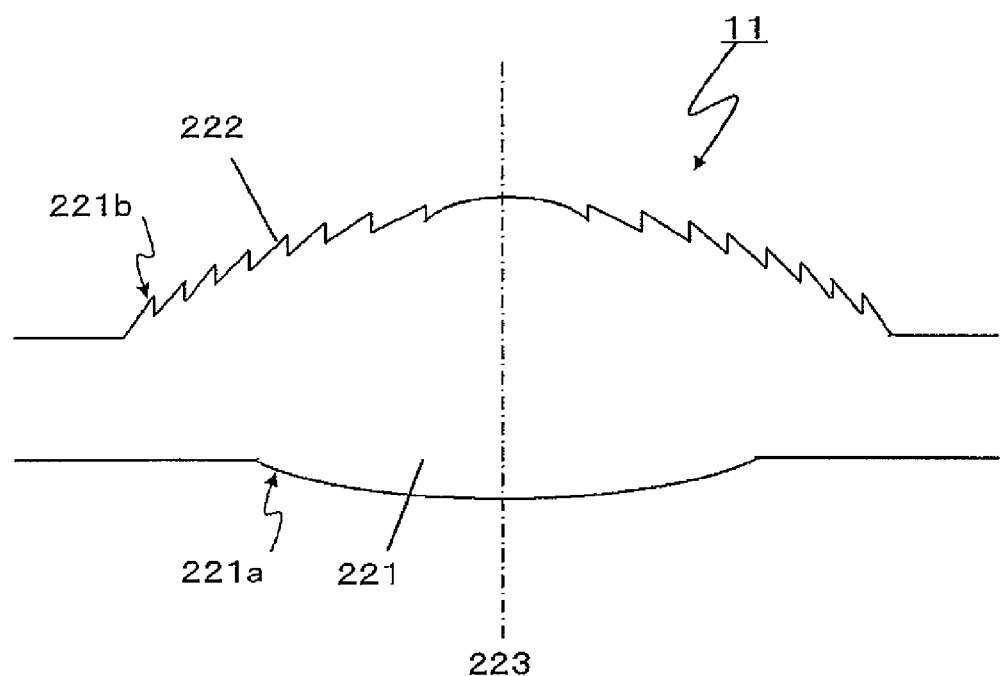
[FIG. 1]

FIG. 1 is a cross-sectional view showing an embodiment of a diffraction grating lens according to the present invention. A diffraction grating lens 11 shown in FIG. 1 includes a lens body 221 and a diffraction grating 222 provided on the lens body 221. The lens body 221 has a first surface 221a and a second surface 221b, with the diffraction grating 222 being provided on the second surface 221b.

Although the diffraction grating 222 is provided on the second surface 221b in the present embodiment, it may be provided on the first surface 221a, or each of the first surface 221a and the second surface 221b may have one provided thereon.

The present embodiment illustrates the base shapes of the first surface 221a and the second surface 221b to be aspherical shapes. However, the base shapes may be spherical or planar. Moreover, the first surface 221a and the second surface 221b may have an identical base shape, or different base shapes. Although the base shapes of the first surface 221a and the second surface 221b are convex aspherical shapes, they may be concave aspherical shapes. Furthermore, one of the first surface 221a and the second surface 221b may have a convex base shape and the other may have a concave base shape.

Figure 2:
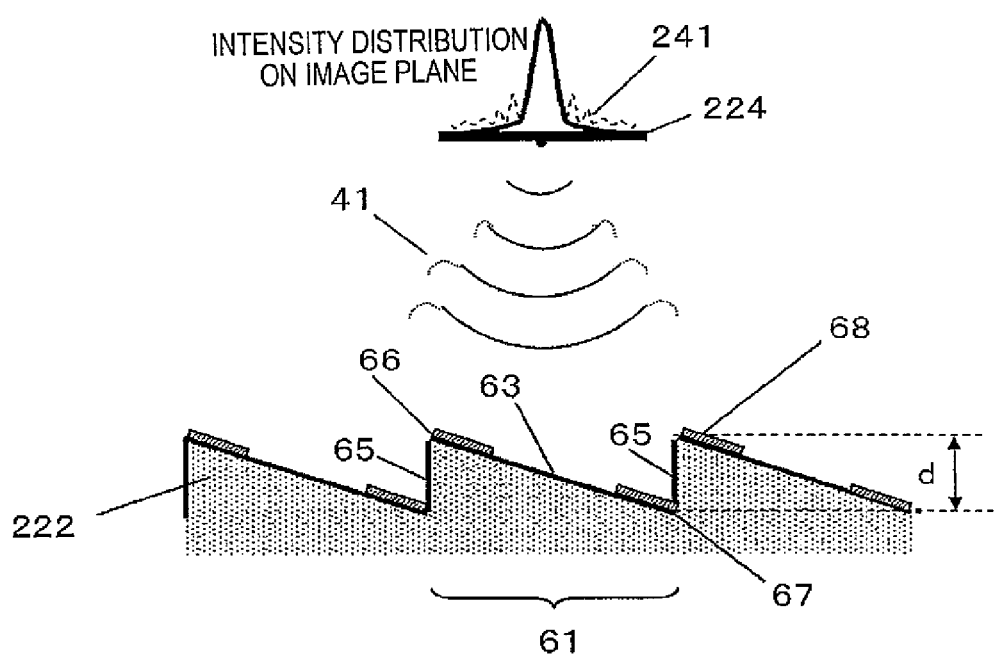
[FIG. 2]

FIG. 2 shows an enlarged view of the diffraction grating lens of the present embodiment. The diffraction grating 222 includes a plurality of annular zones 61 and a plurality of step surfaces 65, with one step surface 65 being provided between every adjoining pair of annular zones 61. Each annular zone 61 includes a slope 63 that is inclined along the width direction of the annular zone. The step surface 65 connects to an edge 66 of the slope 63 and to a foot 67 of an adjoining slope 63. Each annular zone 61 is an annular portion interposed between step surfaces 65. In the present embodiment, the annular zones 61 are disposed in concentric circles around an optical axis 223 of the aspherical surface which is the base shape of the second surface 221b. Although it is not necessary for the annular zones 61 to be disposed in concentric circles, it is desirable that the annular zones 61 are rotation symmetrical with respect to the optical axis 223 in order to ensure good aberration characteristics in an optical system for imaging purposes. In this case, the width direction of each annular zone 61 is the radial direction of the two circles of different radii that define the ring of the annular zone 61.

The height d of the step surfaces 65 satisfy eq. (3) below. Herein, m is a design order (m=1 in the case of first-order diffracted light); λ is a used wavelength; and $n_1(\lambda)$ is a refractive index of the material of the lens body at λ.

[math. 3]

$$d = \frac{m \cdot \lambda}{n_1(\lambda) - 1} \quad (3)$$

When the diffraction grating lens 11 is used for imaging or the like, the diffraction grating 222 is designed so that light of used wavelengths within the same wavelength region is to enter and that light is to be diffracted in the same order of diffraction. Therefore, the heights d of the step surfaces 65 are designed to substantially the same value, in accordance with eq. (3). The values being substantially the same means that the following eq. (3') is satisfied by the heights d, for example.

[math. 4]

$$0.9d \leq \frac{m \cdot \lambda}{n_1(\lambda) - 1} \leq 1.1d \quad (3')$$

Each annular zone 61 is light-transmissive across its entire area along the width direction. In other words, light entering the diffraction grating lens 11 at the second surface 221b on which the diffraction grating 222 is provided, opposite from the first surface 221a, goes out from the entire slope 63 of each annular zone 61 of the diffraction grating 222. However, in each annular zone 61, the light transmittance near at least one of its both ends along the width direction is made smaller than the light transmittance near a central portion along the width direction. In the present embodiment, on the slope 63 near at least one of both ends along the width direction, each annular zone 61 includes a light transmittance adjustment film 68 composed of a material whose light transmittance is smaller than that of the material of the lens body 221, this being in order to reduce light transmittance. The light transmittance adjustment film 68 can be formed via printing, mold application, vapor deposition, dipping, or the like. However, its material, thickness, and the like must be selected so as not to provide complete shading. The light transmittance adjustment film 68 may uniformly cover near each end of the slope 63, or, a plurality of minute regions that are covered by the light transmittance adjustment film 68 and a plurality of uncovered minute regions may be provided with a predetermined areal density, either regularly or randomly. Instead of providing the light transmittance adjustment film 68, light transmittance may be decreased by forming minute bumps and dents on the slope 63 near at least one of both ends along the width direction for increased surface roughness.

Moreover, in each annular zone 61, in order to ensure that the light transmittance is smaller near at least one of both ends along the width direction than near the central portion, the material composing the lens body 61 may be differentiated between: near both ends or one end along the width direction; and near the central portion along the width direction. Furthermore, near both ends of each annular zone 61, light transmittance may be uniform along the width direction, or light transmittance may decrease from the central portion toward the step surface in a gradual or stepwise manner.

With the above construction, the wavefront of light traveling through each annular zone has its light intensity decreased near the contour 41, whereby the intensity of diffracted light caused by the phenomenon of bending-around of the wavefront also decreases. As a result, occurrence of stripe flare light can be reduced.

Figure 3:
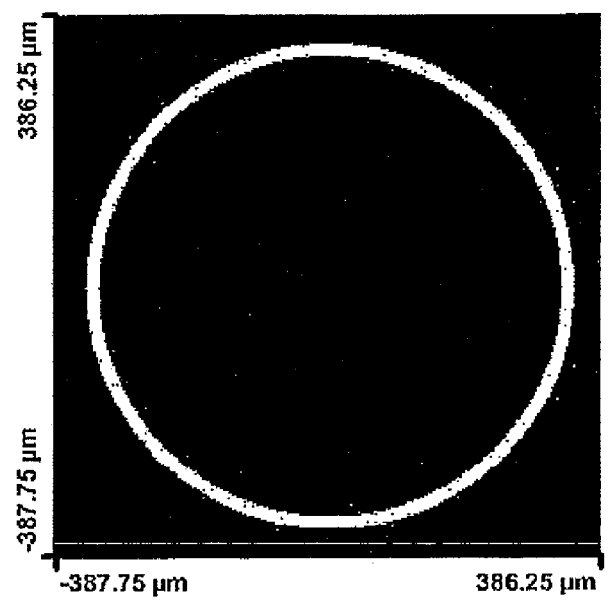
[FIG. 3]

Next, the effect of reducing stripe flare light in the present embodiment will be described by using simulation results. In this simulation, paying attention to one annular zone of the diffraction grating lens, a diffraction image of light transmitted through that annular zone is determined through calculations. In FIG. 3, it is assumed that only the annular zone that is illustrated as white transmits light, while the other annular zones are shaded so as not to allow light to pass therethrough.

COMPARATIVE EXAMPLE 1

Figure 4:
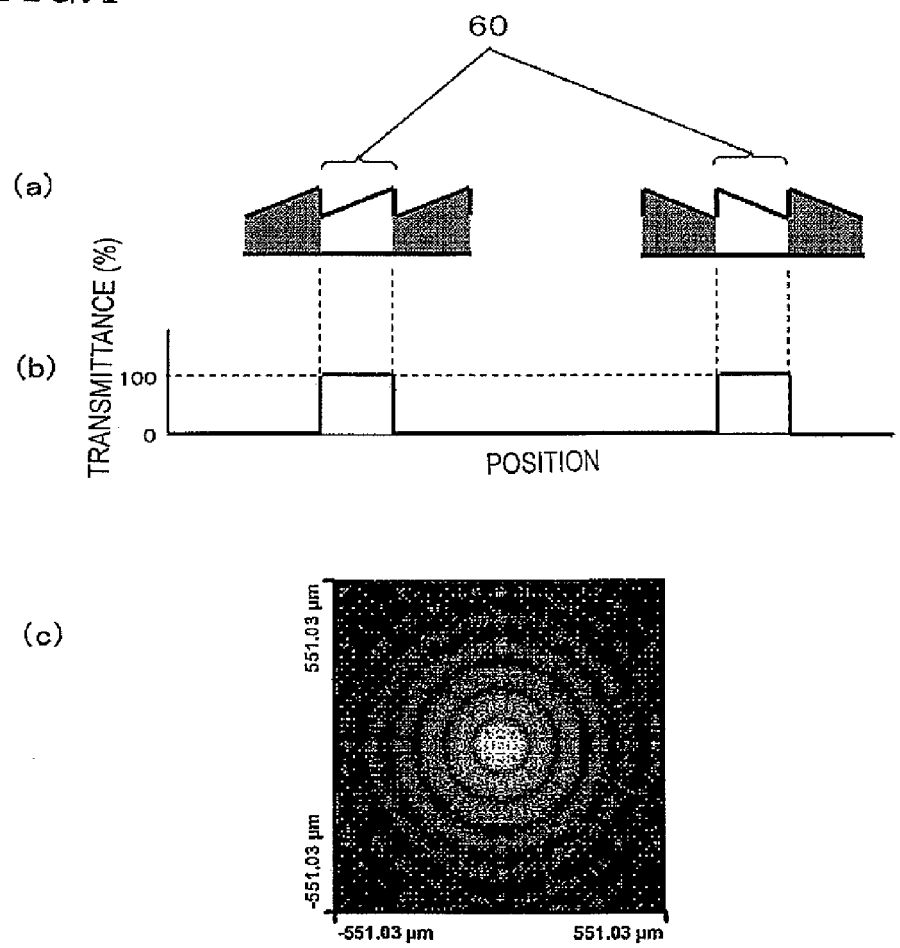
[FIG. 4] (*a*) is a cross-sectional view of a conventional diffraction grating lens in a plane which contains the optical axis; (*b*) is a diagram showing a light transmittance distribution of the respective annular zones of the conventional diffraction grating lens; and (*c*) is a diagram showing a state of stripe flare light associated with the conventional diffraction grating lens.

FIG. 4 shows results of a conventional diffraction grating lens. FIG. 4(*a*) is a cross-sectional view of a conventional diffraction grating lens in a plane which contains the optical axis. An annular zone 60 illustrated as white is the annular zone which transmits light.

FIG. 4(*b*) shows a light transmittance distribution of the respective annular zones of the diffraction grating lens. The annular zone 60 has 100% light transmittance across the entire area along the width direction of the annular zone. The other annular zones have 0% light transmittance. Note that FIG. 4(*a*) and FIG. 4(*b*) are partially enlarged for ease of understanding, and therefore do not correspond to FIG. 3 in scale.

FIG. 4(*c*) shows an image of a light beam traveling through the diffraction grating lens being and being converged on a focal plane. In order to conjure up a situation where stripe flare light is conspicuous, as in the case of take an image of a bright light source, the image brightness was adjusted so that its maximum value was 1/10000 of the center luminance of the image. Therefore, the main light is in a saturated state. As used herein, main light is a circular portion in the center, and all the surrounding rings are caused by stripe flare light. As is clear from FIG. 4(*c*), it can be confirmed that a number of stripes of flare light are occurring in concentric circles. Each concentric circle of flare light is occurring with a relatively broad width.

EXAMPLE 1

Figure 5:
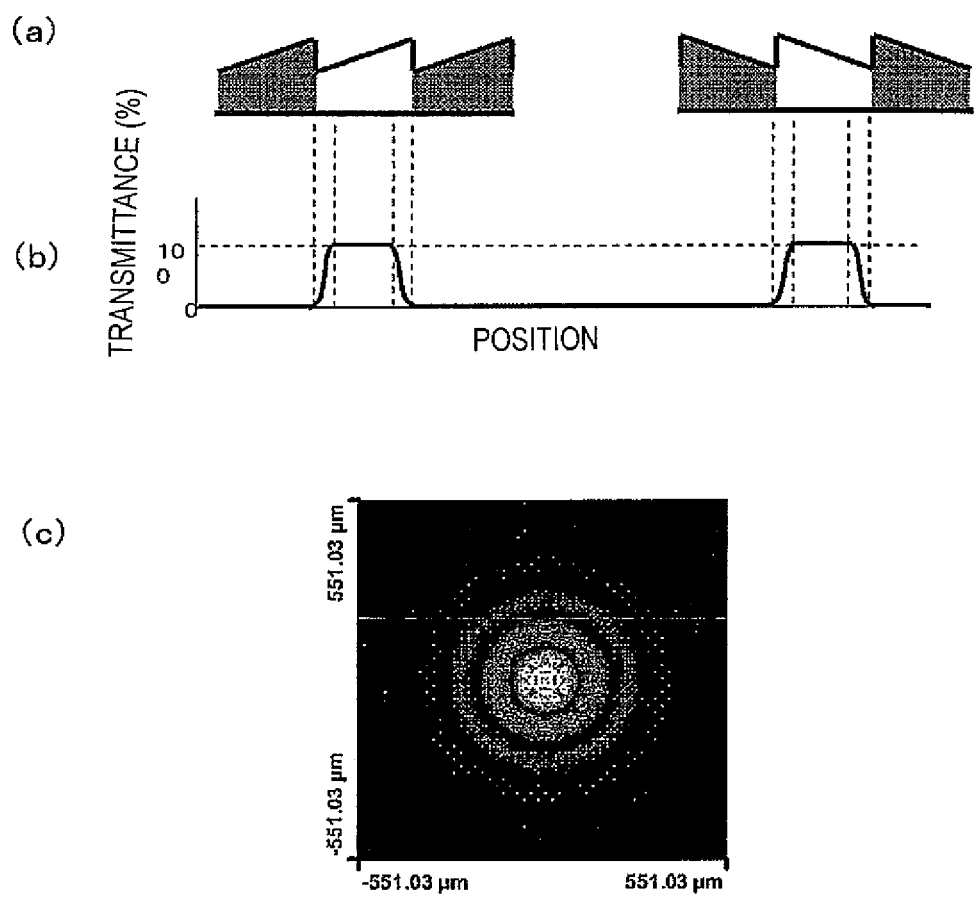
[FIG. 5] (*a*) is a cross-sectional view in a plane which contains the optical axis of the diffraction grating lens of Example 1; (*b*) is a diagram showing a light transmittance distribution of the respective annular zones of the diffraction grating lens of Example 1; and (*c*) is a diagram showing a state of stripe flare light associated with the diffraction grating lens of Example 1.

FIG. 5 shows results of Example 1 of the present invention, where the light transmittance of each annular zone is lowered near both ends along the width direction of the annular zone. FIG. 5(*a*) to FIG. 5(*c*) are drawn to the same effect as FIG. 4(*a*) to FIG. 4(*c*), and descriptions thereof are omitted. As shown in FIG. 5(*b*), each annular zone has 100% light transmittance near the central portion; however, near both ends along the width direction of the annular zone, the light transmittance is gradually decreased from the central portion toward both ends of the annular zone. A resultant image is shown in FIG. 5(*c*). Note that, in actual imaging, automatic adjustment of the shutter speed and gain is made in accordance with the size of the area of the saturated main light. The maximum value of the brightness of the image of FIG. 5(*c*) was adjusted so that the area of the main light in FIG. 5(*c*) equals the area of the main light in FIG. 4(*c*).

From a comparison between FIG. 5(*c*) and FIG. 4(*c*), it can be confirmed that, the number of occurrences and amount of occurrence of the stripes of flare light are both reduced relative to the main light. Thus, it can be seen that stripe flare light can be reduced by lowering the light transmittance of the annular zone at both ends along the width direction from the central portion toward both ends of the annular zone.

EXAMPLE 2

Figure 6:
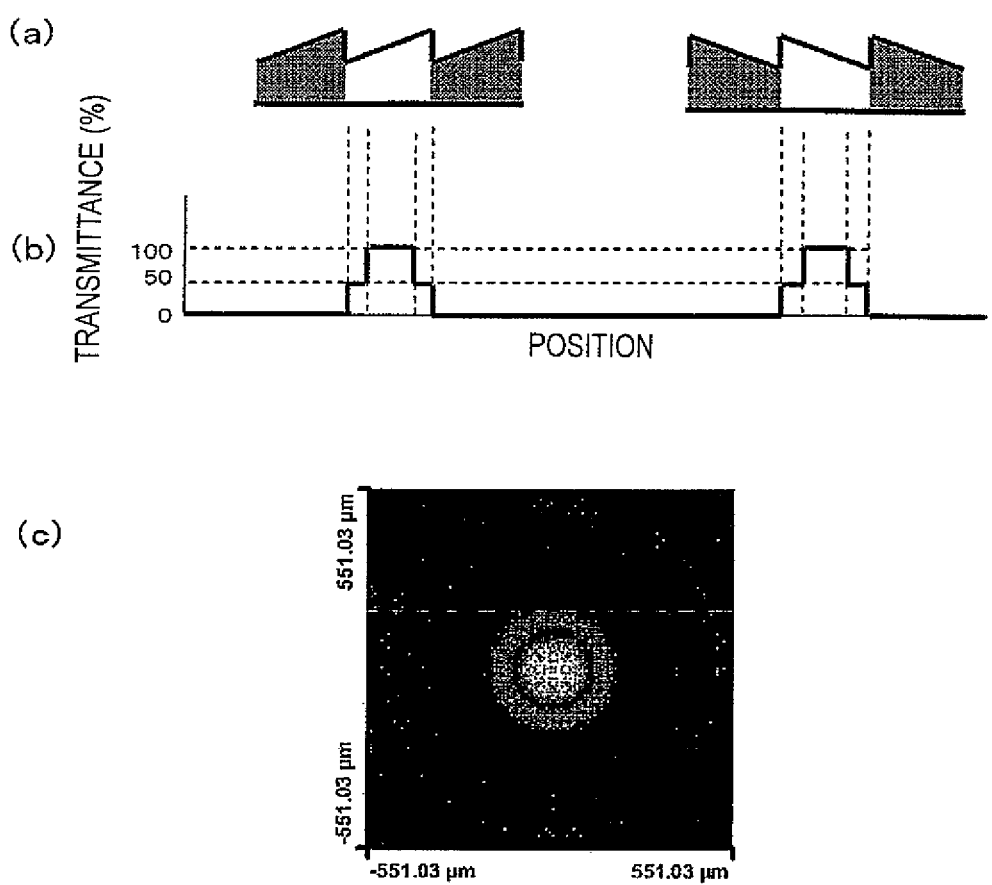
[FIG. 6] (*a*) is a cross-sectional view in a plane which contains the optical axis of the diffraction grating lens of Example 2; (*b*) is a diagram showing a light transmittance distribution of the respective annular zones of the diffraction grating lens of Example 2; and (*c*) is a diagram showing a state of stripe flare light associated with the diffraction grating lens of Example 2.

FIG. 6 shows results of Example 2 of the present invention, where light transmittance is lowered in a stepwise manner at both ends along the width direction of each annular zone. FIG. 6(*a*) to FIG. 6(*c*) are drawn to the same effect as FIG. 4(*a*) to FIG. 4(*c*), and descriptions thereof are omitted. As shown in FIG. 6(*b*), while each annular zone has 100% light transmittance in the central portion, the light transmittance is made 50% near both ends along the width direction of the annular zone. A resultant image is shown in FIG. 6(*c*). In the present example, too, it can be confirmed that the number of occurrences and amount of occurrence of the stripes of flare light are both reduced relative to FIG. 4(*c*). Example 1 is directed to a construction where light transmittance is gradually lowered; however, in the present example, the light transmittance near both ends along the width direction of the annular zone is constant. Using such a structure provides the advantage of easy manufacturing.

Although the transmittance near both ends is set to 50% in this Example 2, the light transmittance does not need to be 50%, but may be 20 to 80%, and preferably 30 to 70%. When it is 20 to 80%, an effect of blurring the contour of the wavefront of light transmitted through the annular zones can be obtained, and it is possible to reduce stripe flare light.

However, if complete shading occurs near both ends along the width direction of each annular zone so that the light transmittance is 0%, the width of the annular zone is merely narrowed, and the effects of the present invention cannot be obtained. This case is identical to a state where the width of the annular zone has become narrower, which may result in the stripe flare light becoming even more conspicuous.

In the case where light transmittance is decreased in a stepwise manner, it is not necessary that the light transmittance decrease in a single step as in the present example, but it may decrease in two or more steps.

EXAMPLE 3

Figure 7:
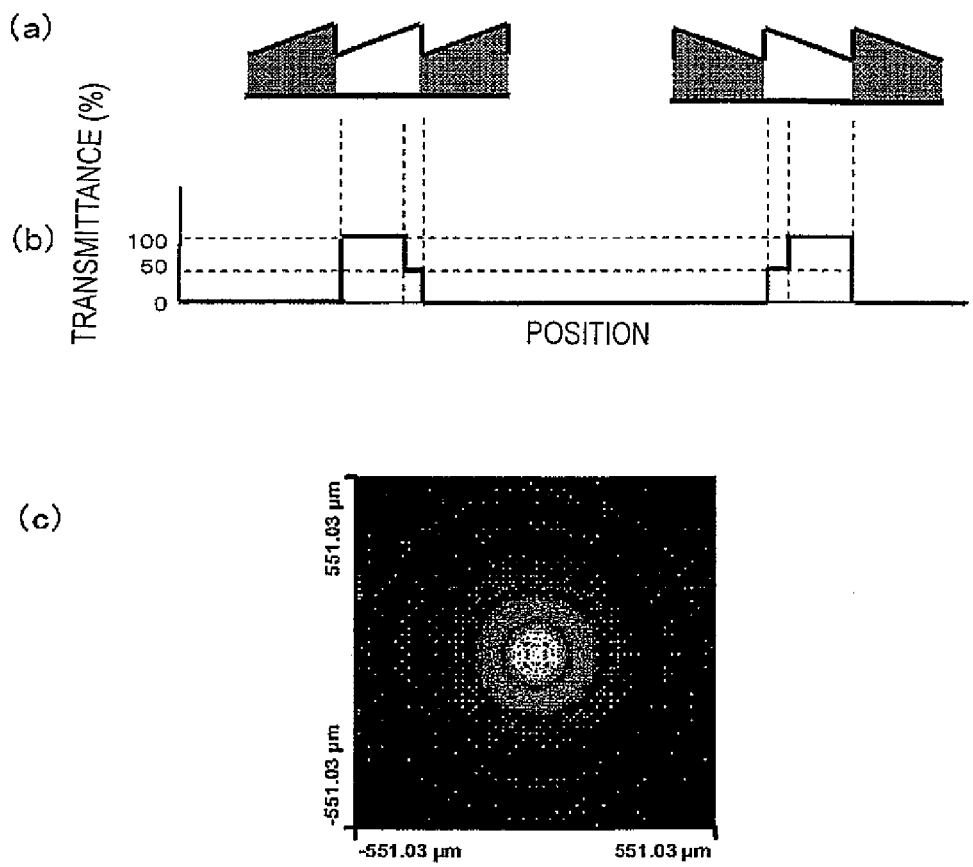
[FIG. 7] (*a*) is a cross-sectional view in a plane which contains the optical axis of the diffraction grating lens of Example 3; (*b*) is a diagram showing a light transmittance distribution of the respective annular zones of the diffraction grating lens of Example 3; and (c) is a diagram showing a state of stripe flare light associated with the diffraction grating lens of Example 3.

FIG. 7 shows results of an example of the present invention where light transmittance is lowered in a stepwise manner only near one end along the width direction of each annular zone. FIG. 7(*a*) to FIG. 7(*c*) are drawn to the same effect as FIG. 4(*a*) to FIG. 4(*c*), and descriptions thereof are omitted. As shown in FIG. 7(*b*), while each annular zone has 100% light transmittance in the central portion, light transmittance is made 50% only near the edge, along the width direction of the slope, of the annular zone. FIG. 7(*c*) shows an image in this case. In this case, too, as compared to FIG. 4(*c*), the number of occurrences and amount of occurrence of the stripes of flare light are both reduced. Thus, it is not necessary that the light transmittance be lowered near both ends along the width direction of the annular zone; the effects of the present invention can be provided even by a construction where light transmittance is lowered near one end. In the case of lowering light transmittance near one end, it is preferable to lower light transmittance near the edge of slope of the annular zone as in the present embodiment. The reason is that the neighborhood of the edge of the slope is easy to work with. For example, a paint having a low light transmittance may be applied on an aspherical mold, and by pressing a diffraction grating plane against this, a low-light-transmittance material can be easily applied near the edge of slope of the annular zone of the diffraction grating.

Figure 8:
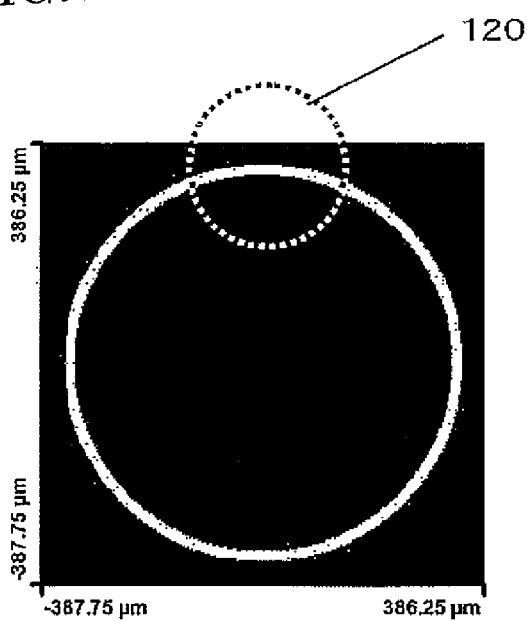
[FIG. 8]

Comparative Example and Examples 1 to 3 described above are directed to results in the cases where light is transmitted through the entire round of each annular zone, i.e., a diaphragm is disposed on the diffraction grating plane, such that the effective area through which a light beam is transmitted spans the entire diffraction grating plane. However, the diaphragm does not need to be disposed on the diffraction grating plane, but may be disposed off the diffraction grating plane. In this case, the effective area at each angle of view is a portion of the diffraction grating plane, e.g., a region 33 in FIG. 24, and the shape of each annular zone in the effective area is not a ring but a portion thereof. In this case, too, as in the respective Examples described above, stripe flare light can be reduced by reducing light transmittance near an end(s) along the width direction of each annular zone. Next, a simulation result in such cases, where a diaphragm is disposed off the diffraction grating plane so that the effective area at each angle of view is defined by a portion of the diffraction grating plane, will be described. In FIG. 8, it is assumed that only the annular zone that is illustrated as white transmits light, while the other annular zones are shaded so as not to allow light to pass therethrough. Moreover, an effective area 120 was set as an effective area at a predetermined angle of view, and a simulation was performed with respect to stripe flare light caused by the annular zones within the effective area 120.

COMPARATIVE EXAMPLE 2

Figure 9:
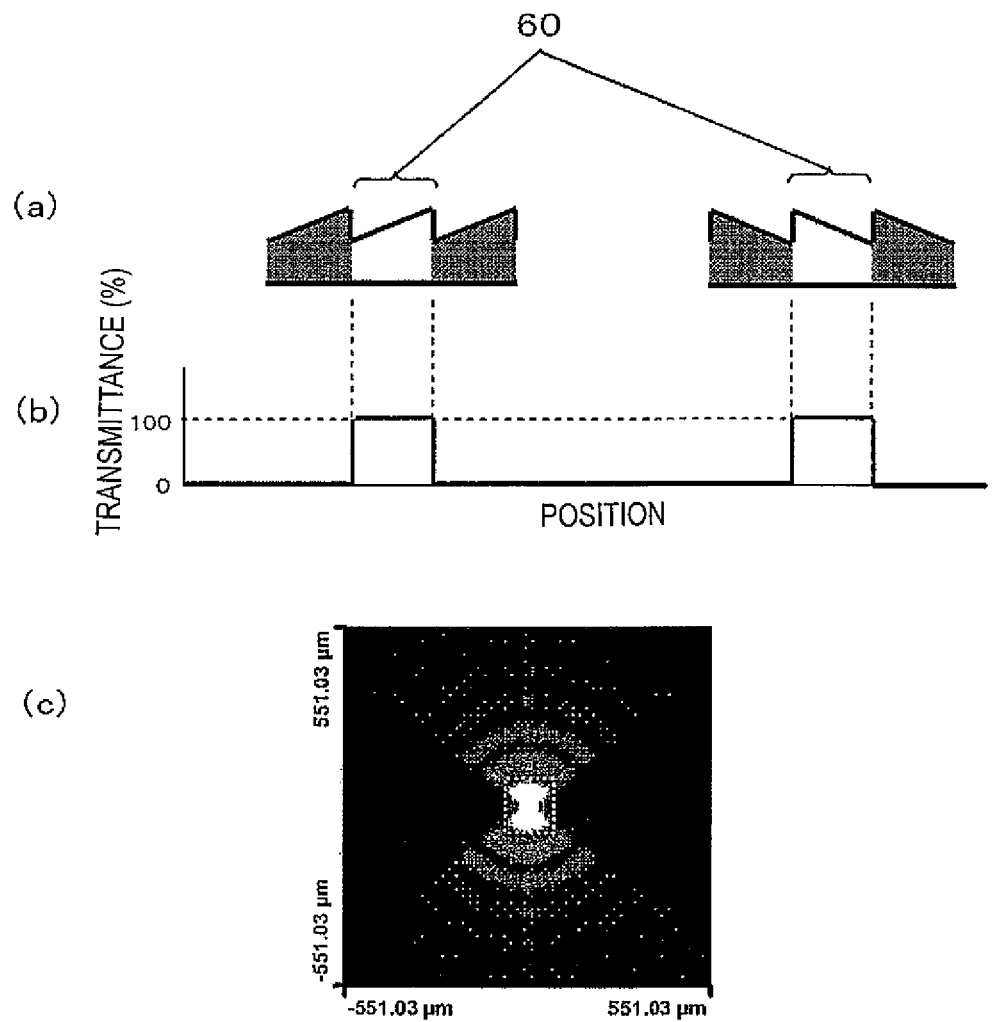
[FIG. 9] (a) is a cross-sectional view of a conventional diffraction grating lens in a plane which contains the optical axis; (b) is a diagram showing a light transmittance distribution of the respective annular zones of the conventional diffraction grating lens; and (c) is a diagram showing a state of stripe flare light associated with the conventional diffraction grating lens.

FIG. 9 shows results of a conventional diffraction grating lens. FIG. 9(*a*) is a cross-sectional view of the diffraction grating lens in a plane which contains the optical axis. An annular zone 60 illustrated as white is the annular zone which transmits light.

FIG. 9(*b*) shows a light transmittance distribution of the respective annular zones of the diffraction grating lens. The annular zone 60 has 100% light transmittance across the entire area along the width direction of the annular zone. The other annular zones have 0% light transmittance. Note that FIG. 9(*a*) and FIG. 9(*b*) are partially enlarged for ease of understanding, and therefore do not correspond to FIG. 8 in scale.

FIG. 9(*b*) shows a light transmittance distribution of the annular zones. Each annular zone has a width P of 18 μm, and has 100% light transmittance across the entire width P of the annular zone.

FIG. 9(*c*) shows a two-dimensional image diagram on the image plane in this case. In FIG. 9(*c*), light in the region surrounded by a white dotted framing in the central portion is an image of the main light, whereas light occurring outside the white dotted framing is the stripe flare light. As shown in FIG. 9(*c*), stripe flare light of a shape resembling spread wings of a butterfly over and under the main light image.

EXAMPLE 4

Figure 10:
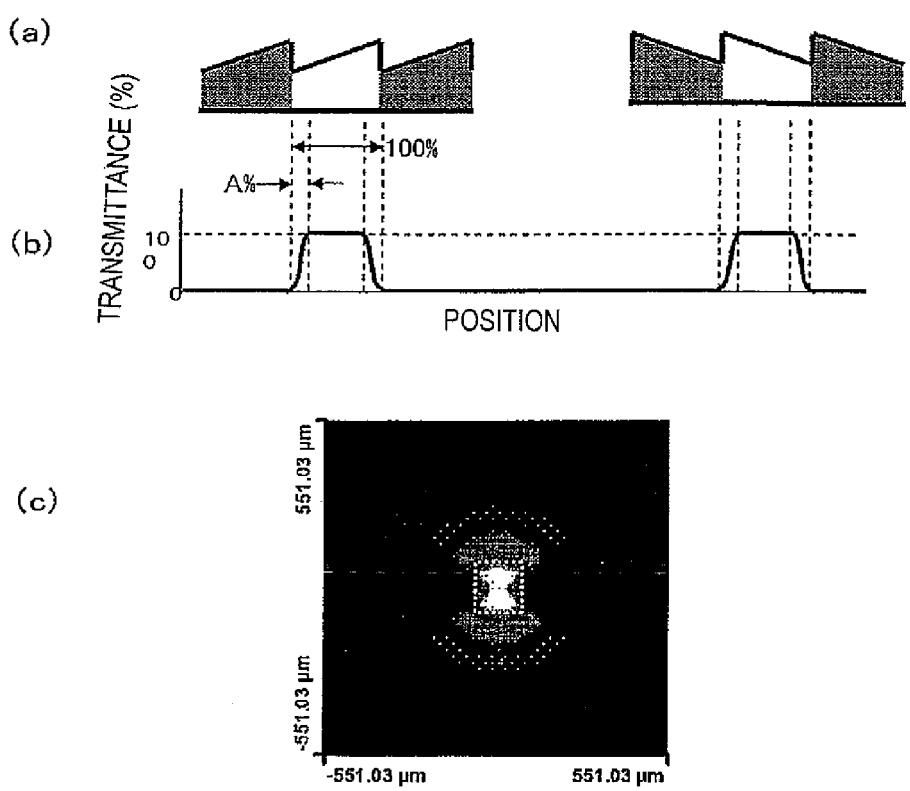
[FIG. 10] (a) is a cross-sectional view in a plane which contains the optical axis of the diffraction grating lens of Example 4; (b) is a diagram showing a light transmittance distribution of the respective annular zones of the diffraction grating lens of Example 4; and (c) is a diagram showing a state of stripe flare light associated with the diffraction grating lens of Example 4.

FIG. 10 shows results of an example of the present invention where light transmittance of each annular zone is lowered near both ends along the width direction of the annular zone. FIG. 10(*a*) to FIG. 10(*c*) are drawn to the same effect as FIG. 9(*a*) to FIG. 9(*c*), and descriptions thereof are omitted.

FIG. 10(*b*) shows a light transmittance distribution of the annular zones. Each annular zone has a width P of 18 μm, and by defining the width P of the annular zone as 100%, a region of lowered light transmittance is provided in a region having a width which accounts for A % near each end along the width direction of the annular zone. For example, in the case where A is 10%, light transmittance is lowered in a region spanning 1.8 μm on one side, and 3.6 μm on both sides. Moreover, in each region with lowered light transmittance, light transmittance is gradually lowered from the central portion toward both ends along the width direction of the annular zone.

FIG. 10(*c*) shows a two-dimensional image diagram on the image plane in the case where A is 10%. In FIG. 10(*c*), it can be confirmed that the amount of occurrence of stripe flare light is reduced relative to Comparative Example 2 shown in FIG. 9(*c*).

Figure 11:
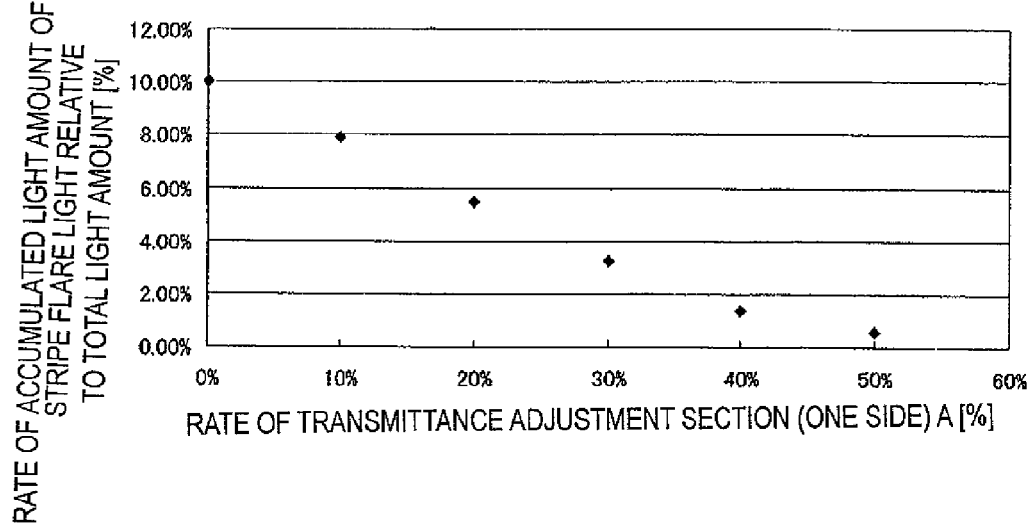
[FIG. 11] A graph showing a relationship between the width A of a region with lowered light transmittance and the amount of occurrence of stripe flare light in the diffraction grating lens of Example 4.

FIG. 11 is a graph showing changes in the rate of the accumulated light amount of stripe flare light relative to the total light amount, where the A value is varied from 0% to 50% by every 10%. The accumulated light amount of stripe flare light refers to an accumulated value of light amount in the region outside the white dotted framing in FIG. 10(*c*). In FIG. 10(*c*), the horizontal axis represents the A value, whereas the vertical axis represents the rate of the accumulated light amount of stripe flare light relative to the total light amount. FIG. 11 indicates that the stripe flare light decreases as the A value increases.

EXAMPLE 5

Figure 12:
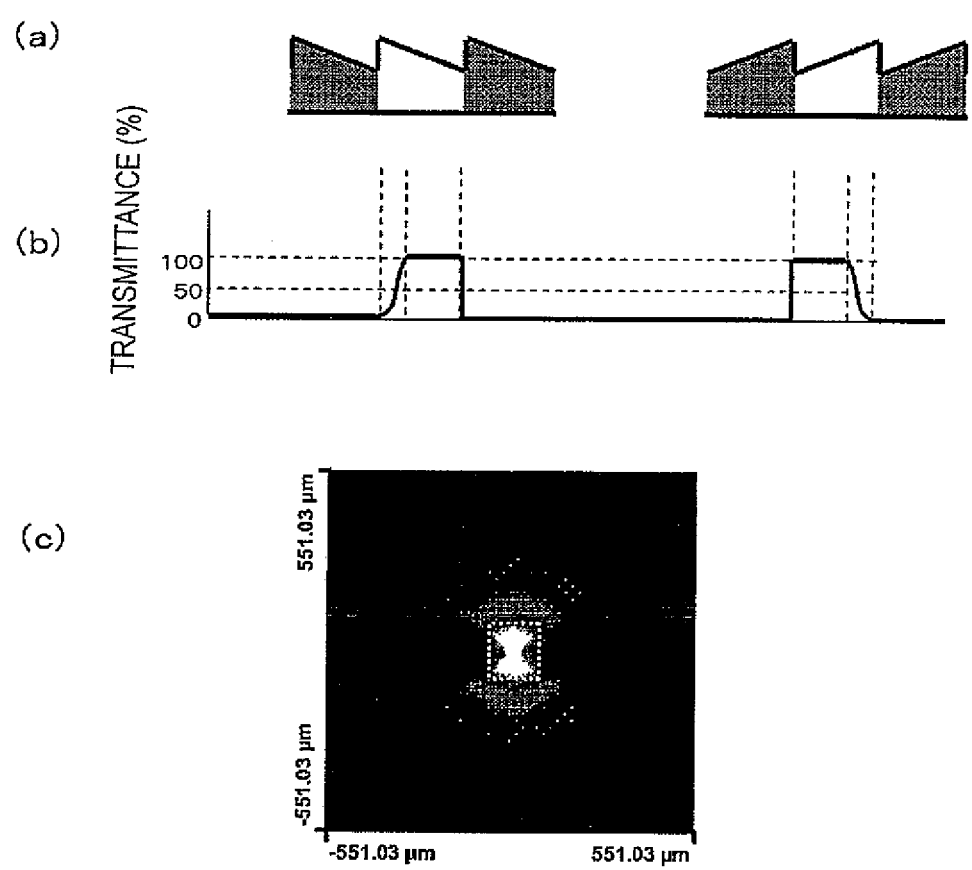
[FIG. 12] (a) is a cross-sectional view in a plane which contains the optical axis of the diffraction grating lens of Example 5; (b) is a diagram showing a light transmittance distribution of the respective annular zones of the diffraction grating lens of Example 5; and (c) is a diagram showing a state of stripe flare light associated with the diffraction grating lens of Example 5.

FIG. 12 shows results of an example of the present invention where light transmittance of each annular zone is lowered near one end along the width direction of the annular zone. FIG. 12(*a*) to FIG. 12(*c*) are drawn to the same effect as FIG. 9(*a*) to FIG. 9(*c*), and descriptions thereof are omitted. Note that, although the blaze edge is oriented toward the optical axis in FIG. 9, it is oriented toward the opposite side from the optical axis in FIG. 12. This is because FIG. 12 is reversed from FIG. 9 in terms of positive or negative power of the phase function. The present invention is similarly applicable regardless of the positive or negative power of the phase function.

FIG. 12(*b*) shows a light transmittance distribution in the present example. Each annular zone has a width P of 18 μm, and by defining the width of the annular zone as 100%, light transmittance is lowered in a region having a 30% width near the edge of the slope of the annular zone, i.e., a region having a width of 5.4 μm.

FIG. 12(*c*) shows a two-dimensional image diagram of the present example. It can be confirmed that stripe flare light is greatly reduced relative to Comparative Example 2 shown in FIG. 9(*c*).

Moreover, the rate of the accumulated light amount of stripe flare light relative to the total light amount is 7.55%. Thus, relative to that of 10% in Comparative Example 2, the stripe flare light is greatly reduced also in quantitative terms.

On the other hand, as compared to the case where light transmittance is lowered in a region of 30% width near both ends of the annular zone in Example 4, the rate of the accumulated light amount of stripe flare light in the present example, i.e., 7.55%, is approximately twice as much as 3.23% of Example 4, and hence the effect of reducing stripe flare light is halved. However, since light transmittance is lowered only near the edge of slope of the annular zone, the present example permits easy production by a method of e.g. applying a paint only at the edge.

EXAMPLE 6

Figure 13:
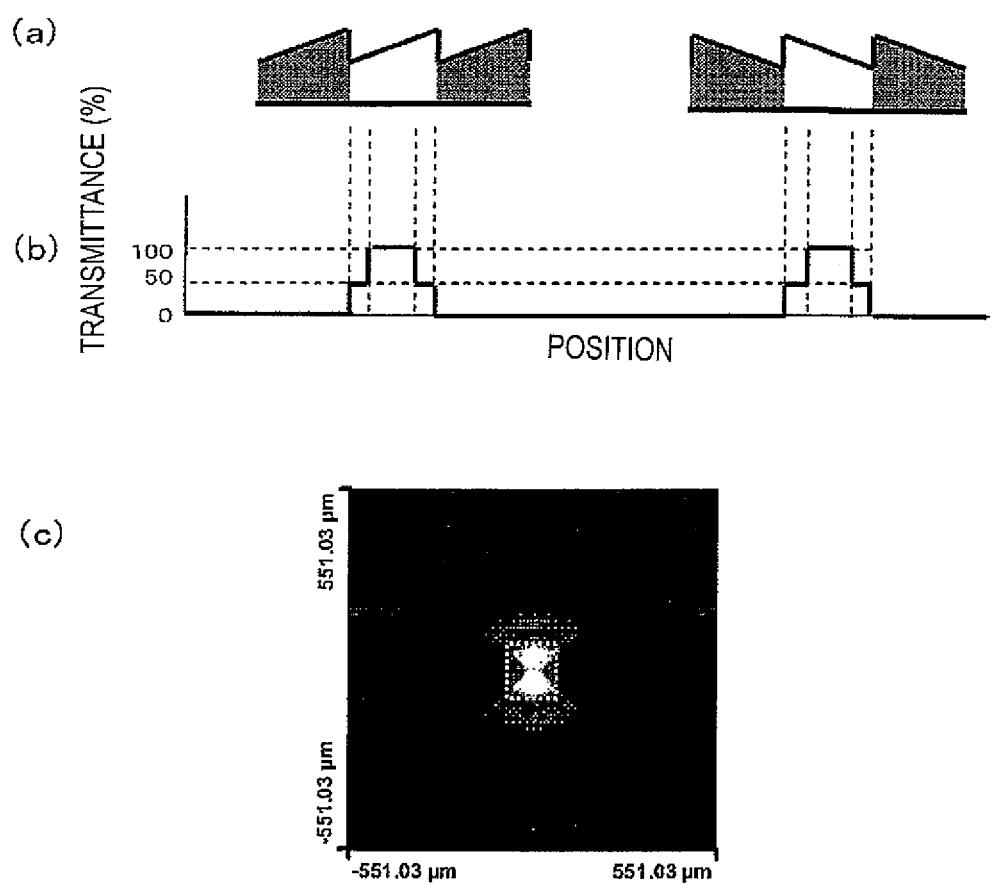
[FIG. 13] (a) is a cross-sectional view in a plane which contains the optical axis of the diffraction grating lens of Example 6; (b) is a diagram showing a light transmittance distribution of the respective annular zones of the diffraction grating lens of Example 6; and (c) is a diagram showing a state of stripe flare light associated with the diffraction grating lens of Example 6.

FIG. 13 shows results of Example 6 of the present invention where light transmittance of each annular zone is lowered near both ends along the width direction of the annular zone. FIG. 13(*a*) to FIG. 13(*c*) are drawn to the same effect as FIG. 9(*a*) to FIG. 9(*c*), and descriptions thereof are omitted.

In FIG. 13(a), light transmittance is lowered in regions near both ends along the width direction of the annular zone. FIG. 13(b) shows a light transmittance distribution along the width direction of the annular zones. Each annular zone has a width P of 18 μm, and by defining the width of the annular zone as 100%, light transmittance is made 50% in a region of 16.7% width near each end along the width direction of the annular zone, i.e., a region having a width of 3 μm.

FIG. 13(c) shows a two-dimensional image diagram of the present example. In the present example, the rate of the accumulated light amount of stripe flare light relative to the total light amount is 4.63%. Thus, relative to that of 10% in Comparative Example 2, stripe flare light is greatly reduced also in quantitative terms.

Although the A value is set to 16.7% in the present example, this value is not a requirement, and an effect of reducing stripe flare light on the image can be observed so long as it is about 5 to 30%. Although the light transmittance is made 50%, 50% is not a requirement. Again, an effect of reducing stripe flare light on the image can be observed so long as the light transmittance is 20 to 80%.

In the case where light transmittance is decreased in a stepwise manner, it is not necessary that the light transmittance decrease in a single step as in the present example, but it may decrease in two or more steps.

EXAMPLE 7

Figure 14:
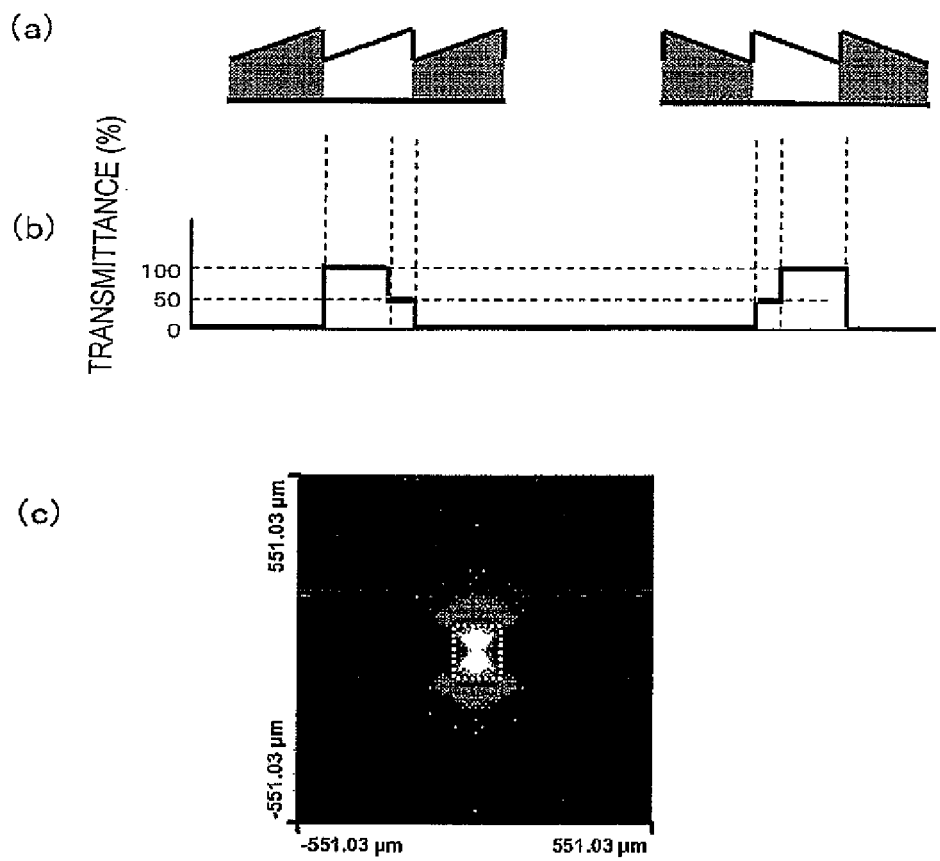
[FIG. 14] (a) is a cross-sectional view in a plane which contains the optical axis of the diffraction grating lens of Example 7; (b) is a diagram showing a light transmittance distribution of the respective annular zones of the diffraction grating lens of Example 7; and (c) is a diagram showing a state of stripe flare light associated with the diffraction grating lens of Example 7.

FIG. 14 shows results of Example 7 of the present invention where light transmittance of each annular zone is lowered near one end along the width direction of the annular zone. FIG. 14(a) to FIG. 14(c) are drawn to the same effect as FIG. 9(a) to FIG. 9(c), and descriptions thereof are omitted.

In FIG. 14(a), light transmittance is lowered only in a region near one end along the width direction of the annular zone. In the present example, light transmittance is lowered near the edge of slope of the annular zone. FIG. 14(b) shows a light transmittance distribution in the present example. Each annular zone has a width P of 18 μm, and by defining the width of the annular zone as 100%, light transmittance is made 50% in a region having a 16.7% width near the edge of slope of the annular zone, i.e., a region having a width of 3 μm.

FIG. 14(c) shows a two-dimensional image diagram of the present example. In the present example, the rate of the accumulated light amount of stripe flare light relative to the total light amount is 7.36%. Thus, relative to that of 10% in Comparative Example 2, stripe flare light is greatly reduced also in quantitative terms.

In order to reduce stripe flare, it is desirable to apply the present invention to all of the annular zones of the diffraction grating lens because, for each annular zone, the light transmitted therethrough respectively generates stripe flare. However, it is not necessarily provided for all annular zones, but may be locally provided, e.g., only in the periphery or the central portion of the diffraction grating lens. In particular, the periphery of a diffraction grating lens is likely to have a small annular zone pitch, and thus is liable to strong stripe flare. Therefore, when it is to be locally provided, it is more effectively provided in the periphery of the diffraction grating lens alone.

Note that what determines whether the edge of an annular zone is located toward the optical axis or toward the opposite side from the optical axis is the phase function and/or the relative magnitudes of the refractive indices of the two substances on both sides of the diffraction grating plane. For example, the edge of the slope of each annular zone is toward the optical axis in the case of a diffraction grating lens shown in FIG. 1; however, as will be described in Embodiment 2, in the case where an optical adjustment layer is provided on the surface of the diffraction grating, the edge may be toward the opposite side from the optical axis depending on the relative sizes of the refractive indices of the lens body and the optical adjustment layer. However, the present invention is applicable to either case, and similar effects are obtained.

Although the present embodiment only illustrates a single diffraction grating lens 11, there may be a plural number of lenses in the optical system for imaging purposes.

In the case where the optical system for imaging purposes includes a plurality of lenses, the lens having a diffraction grating formed thereon may be any of the plurality of lenses. The face bearing the diffraction grating may be oriented toward the subject, or toward the imaging side.

(Embodiment 2)

Figure 15:
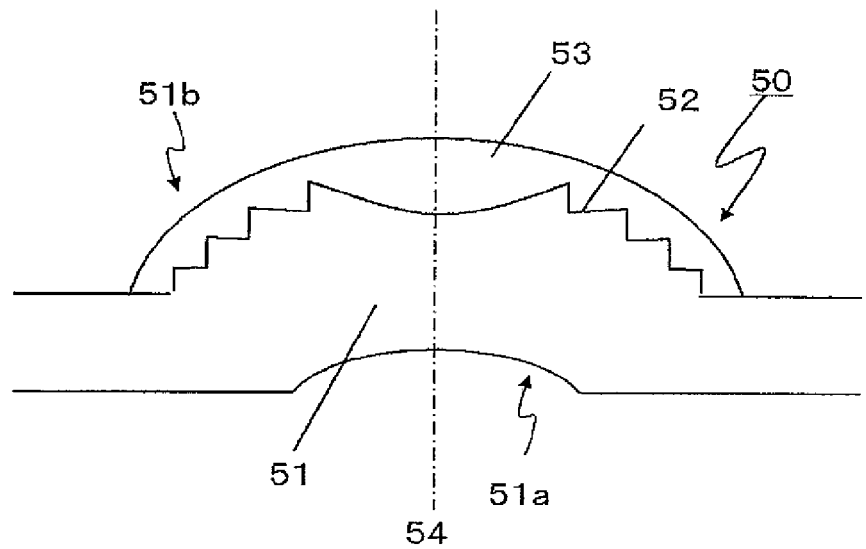
[FIG. 15]

FIG. 15 is a cross-sectional view showing another embodiment of a diffraction grating lens according to the present invention. A diffraction grating lens 50 shown in FIG. 15 includes a lens body 51, a diffraction grating 52 provided on the lens body 51, and an optical adjustment layer 53 provided on the diffraction grating 52. Like numerals will be used for like constituent elements to those in Embodiment 1, and descriptions thereof will be omitted. The diffraction grating lens 50 differs from the diffraction grating lens 11 of Embodiment 1 in that an optical adjustment layer 53 is included which is provided on the lens body 51 so as to cover the diffraction grating 52.

As the optical adjustment layer 53, a resin, glass, a composite material of a resin and inorganic particles, or the like may be used. In the present embodiment, the direction of the edge of each annular zone of the diffraction grating 52 is reversed from Embodiment 1. This is because of the assumption that the refractive index of the optical adjustment layer 53 is greater than the refractive index of the lens body 51; however, depending on the relative magnitudes of the refractive indices of the lens body and optical adjustment layer and the phase function, the same direction as that of Embodiment 1 may be adopted.

Figure 16:
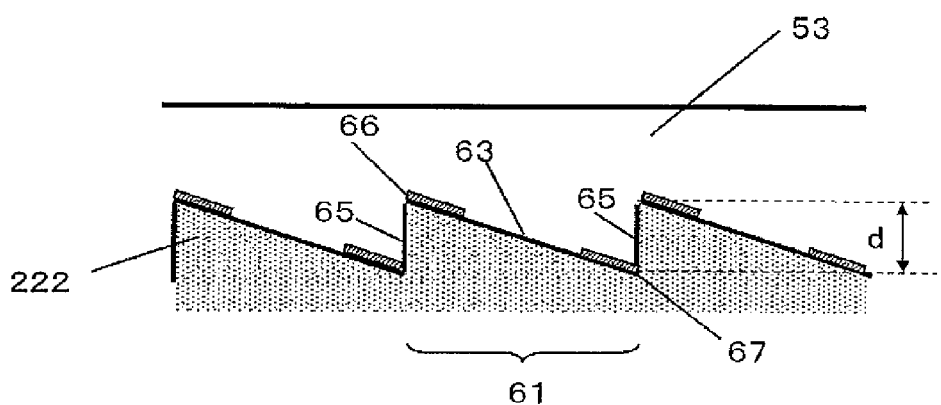
[FIG. 16]

FIG. 16 is a cross section showing enlarged the neighborhood of the diffraction grating of the diffraction grating lens 50. The diffraction grating 52 includes a plurality of annular zones 61 and a plurality of step surfaces 65, with one step surface 65 being provided between every adjoining pair of annular zones 61. Each annular zone includes a slope 63 that is inclined along the width direction of the annular zone. The step surface 65 interconnects an edge 66 of the slope 63 and a foot 67 of an adjoining slope 63. Each annular zone 61 is an annular protrusion interposed between step surfaces 65. In the present embodiment, the annular zones 61 are disposed in concentric circles around an optical axis 54 of the aspherical surfaces which are the base shape of the first surface 51a and the base shape of the second surface 51b. Note that it is not necessary for the annular zones 61 to be disposed in concentric circles. However, in order to ensure good aberration characteristics in an optical system for imaging purposes, it is desirable that the annular zone shapes of the annular zones 61 are rotation symmetrical with respect to the optical axis 53.

The height d of the step surfaces 65 satisfies eq. (4) below. Herein, m is a design order (m=1 in the case of first-order diffracted light); λ is a used wavelength; and $n_1(\lambda)$ is a refractive index of the material of the lens body at λ; and $n_2(\lambda)$ is a refractive index of the optical adjustment layer material at λ. In the case where $n_2$ is greater than $n_1$, d has a negative value, which means that the phase difference is to be inverted before being added to the base shape.

[math. 5]

$$d = \frac{m \cdot \lambda}{n_1(\lambda) - n_2(\lambda)} \quad (4)$$

Preferably, the used wavelength λ is a wavelength in the visible light region, and eq. (4) is substantially satisfied with respect to any wavelength λ in the entire visible light region. It being substantially satisfied means that the relationship of eq. (4') below is satisfied, for example.

[math. 6]

$$0.9d \leq \frac{m \cdot \lambda}{n_1(\lambda) - n_2(\lambda)} \leq 1.1d \quad (4')$$

In this case, since light of any arbitrary wavelength λ in the visible light region substantially satisfies eq. (4), diffracted light of unwanted orders does not occur, so that the wavelength dependence of diffraction efficiency becomes very small and a high diffraction efficiency is obtained.

In order for light of any arbitrary wavelength λn the visible light region to substantially satisfy eq. (4), the lens body may be composed of a material with a refractive index $n_1(\lambda)$ having a wavelength dependence such that d is approximately constant at any arbitrary wavelength λ in the visible light region or the wavelength band of light used, and the optical adjustment layer may be composed of a material with a refractive index $n_2(\lambda)$. Generally speaking, a material having a high refractive index and a low wavelength dispersion and a material having a low refractive index and a high wavelength dispersion are to be combined.

Similarly to Embodiment 1, each annular zone 61 is light-transmissive across its entire area along the width direction. In each annular zone 61, the light transmittance near at least one of both ends along the width direction is made smaller than the light transmittance near a central portion along the width direction. As the method of reducing light transmittance, the same methods as those in Embodiment 1 can be used.

With the above construction, as in Embodiment 1, the wavefront of light traveling through each annular zone has its light intensity decreased near the contour, whereby the intensity of diffracted light caused by a phenomenon of bending-around of the wavefront also decreases. As a result, occurrence of stripe flare light can be reduced.

(Embodiment 3)

Figure 17:
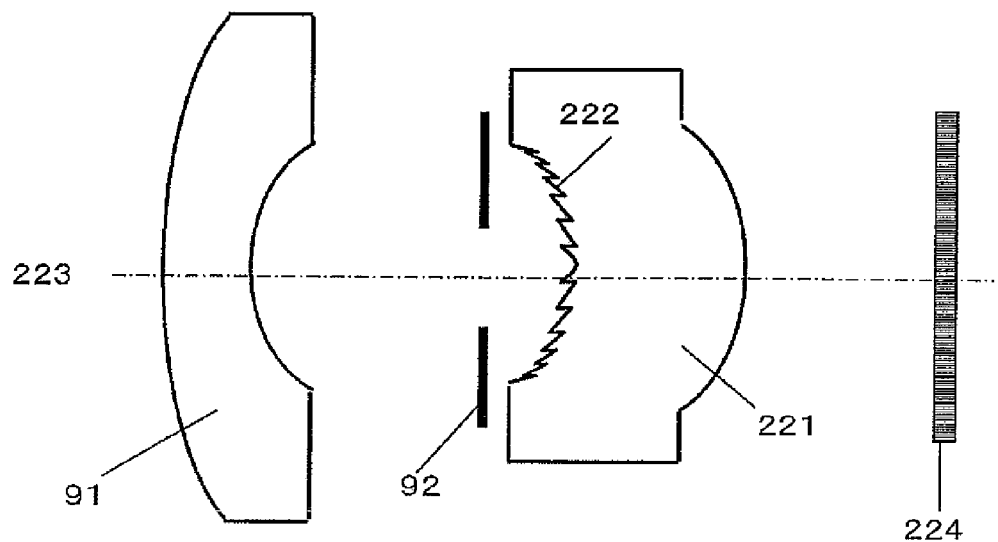
[FIG. 17]

An embodiment of an imaging device according to the present invention will be described. FIG. 17 is a cross-sectional view of an imaging device in which a diffraction grating lens according to the present invention is used.

The imaging device of the present embodiment is a double-lens optical system in which a lens 91 is provided in addition to a diffraction grating lens 221, and includes a diaphragm 92 and an imaging element 224. A paint composed of a material whose light transmittance is smaller than that of the lens body of the diffraction grating lens 221 is applied near the edge and the foot of the slope of each annular zone of a diffraction grating 222 of the diffraction grating lens 221, thus forming a light transmittance adjustment section 11. The number of lenses does not need to be two, but may be three or more. By increasing the number of lenses, the optical performance can be improved. The surface configurations of the lens 91 and the diffraction grating lens 221 may be spherical or aspherical. In the case where the optical system for imaging purposes includes a plurality of lenses, the lens having a diffraction grating formed thereon may be any of the plurality of lenses. The face bearing the diffraction grating may be oriented toward the subject, or toward the imaging side, and there may be plural such faces. The annular zone shapes of the diffraction grating 222 do not need to be disposed in concentric circles around an optical axis 223. However, in order to ensure good aberration characteristics in an optical system for imaging purposes, it is desirable that the annular zone shapes of the diffraction grating 222 are rotation symmetrical with respect to the optical axis 223. The diaphragm 92 may be placed in any arbitrary position, which is to be determined based on the optical design.

(Embodiment 4)

Figure 18:
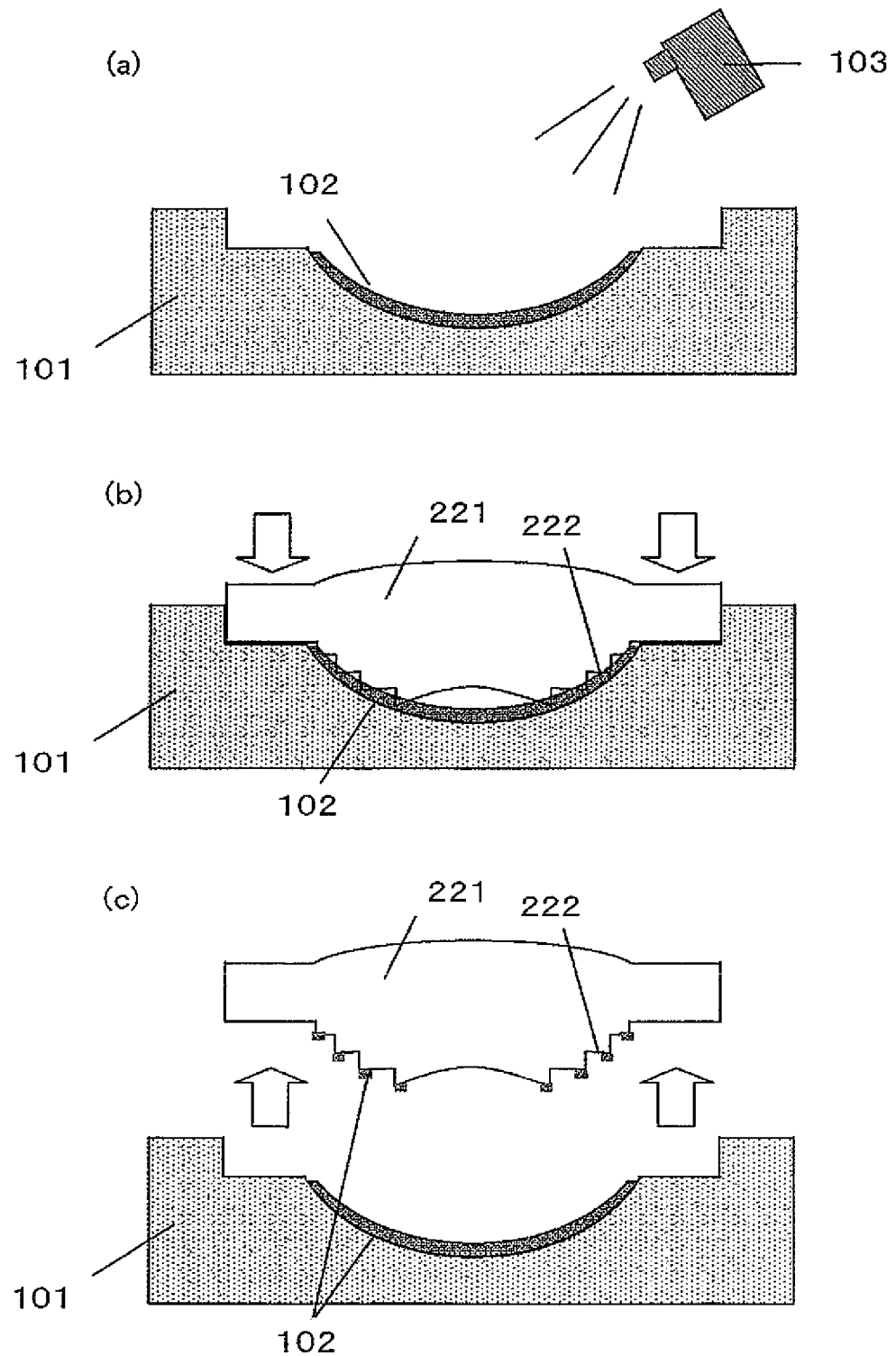
[FIG. 18] (a) to (c) are diagrams describing a method of producing a diffraction grating lens according to the present invention.

An embodiment of a method of producing a diffraction grating lens according to the present invention will be described. FIG. 18 is a diagram describing an embodiment of a method of producing a diffraction grating lens according to the present invention.

First, as shown in FIG. 18(*a*), on a mold 101 which has been processed into a surface configuration defining an envelope extending through the edge of the slope of each annular zone of the diffraction grating, a paint 102 is applied which has an adjusted light transmittance. The method of applying the paint 102 onto the mold 101 may be a method of scattering it by using a spray 103, a method by spin-coating, a dip technique, a method via printing or dropwise application, and the like, for example.

Next, as shown in FIG. 18(*b*), the lens body 221 is pressed against the mold 101 on which the paint 102 has been applied. At this time, only the edge of the slope of each annular zone of the diffraction grating 222 is immersed in the paint 102.

Furthermore, as shown in FIG. 18(*c*), when the lens body 221 is released from the mold, only the edges of the slopes of the diffraction grating 222 have the paint 102 with the adjusted light transmittance painted thereon. By adjusting the thickness of the paint 102 to be applied on the mold 101, the area of the slope of each annular zone that is immersed in the paint 102 is varied, thus making it possible to adjust the area of application on the slope of the annular zone. It is also possible to adjust the thickness of the paint to adhere to the slope based on the viscosity of the paint 102. Note that, if the paint adheres to the slope in too large a thickness, the direction of travel of rays would change in the region in which the paint has adhered, thus affecting the optical characteristics; therefore, it is desirable to make the paint thickness as thin as possible. In the case where an optical adjustment film is to be applied on the diffraction grating, after the paint is allowed to dry, the optical adjustment film may be formed so as to cover the diffraction grating, via mold forming or the like.

The diffraction grating lens shown in FIG. 18 has an inverse phase from that of the diffraction grating lens of Embodiment 1. However, manufacture can be similarly conducted for the diffraction grating lens of Embodiment 1, too. Moreover, a diffraction grating lens which is formed on a concave surface can also be produced by preparing a convex mold 101.

(Embodiment 5)

Figure 19:
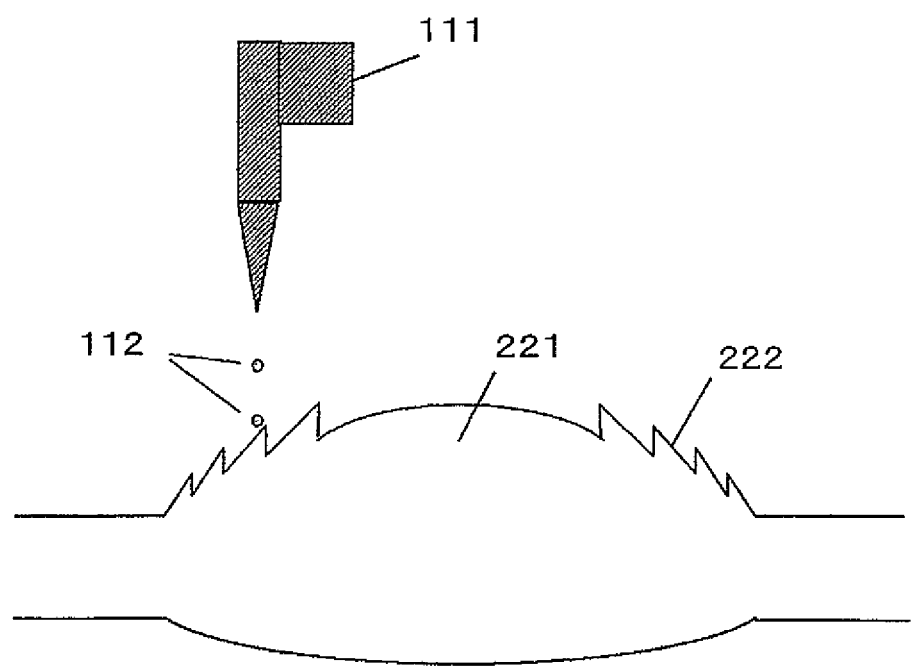
[FIG. 19]

Another embodiment of a method of producing a diffraction grating lens according to the present invention will be described. FIG. 19 is a diagram describing another embodiment of a method of producing a diffraction grating lens according to the present invention. In the present embodiment, a paint composed of a material having a predetermined light transmittance is placed in an ink chamber 111 of an ink-jet printer, and the paint 112 is jetted from a nozzle in fine particle sizes. The jetted paint 112 is applied onto the edges and/or feet of the slopes of the diffraction grating 222, thus lowering the light transmittance in such regions. At this time, the light transmittance can be varied by adjusting the areal density with which to apply the paint. Thus, since the light transmittance is adjustable based on the areal density with which the paint is applied, the light transmittance of the paint itself may be 0%.

The method of lowering light transmittance is not limited to the method of applying a paint on the slopes of annular zones for lowering the light transmittance. For example, it is also possible to lower the light transmittance by adjusting the surface roughness of the slopes of the annular zones. When the slope surface is roughened, light scattering lowers the light transmittance. Possible methods of roughening the slope surface are a method of mechanical processing with an abrasive or the like, a method of providing bumps and dents on the surface of a mold with which to mold the diffraction grating lens, and so on. For example, the mold surface in portions of the mold that correspond to the edges and/or feet of the slopes may be roughened by using an electron beam or etching. Locally roughening the mold surface in this manner makes unnecessary the step of applying a paint and the like, and thus is suitable for mass production.

(Embodiment 6)

Figure 20:
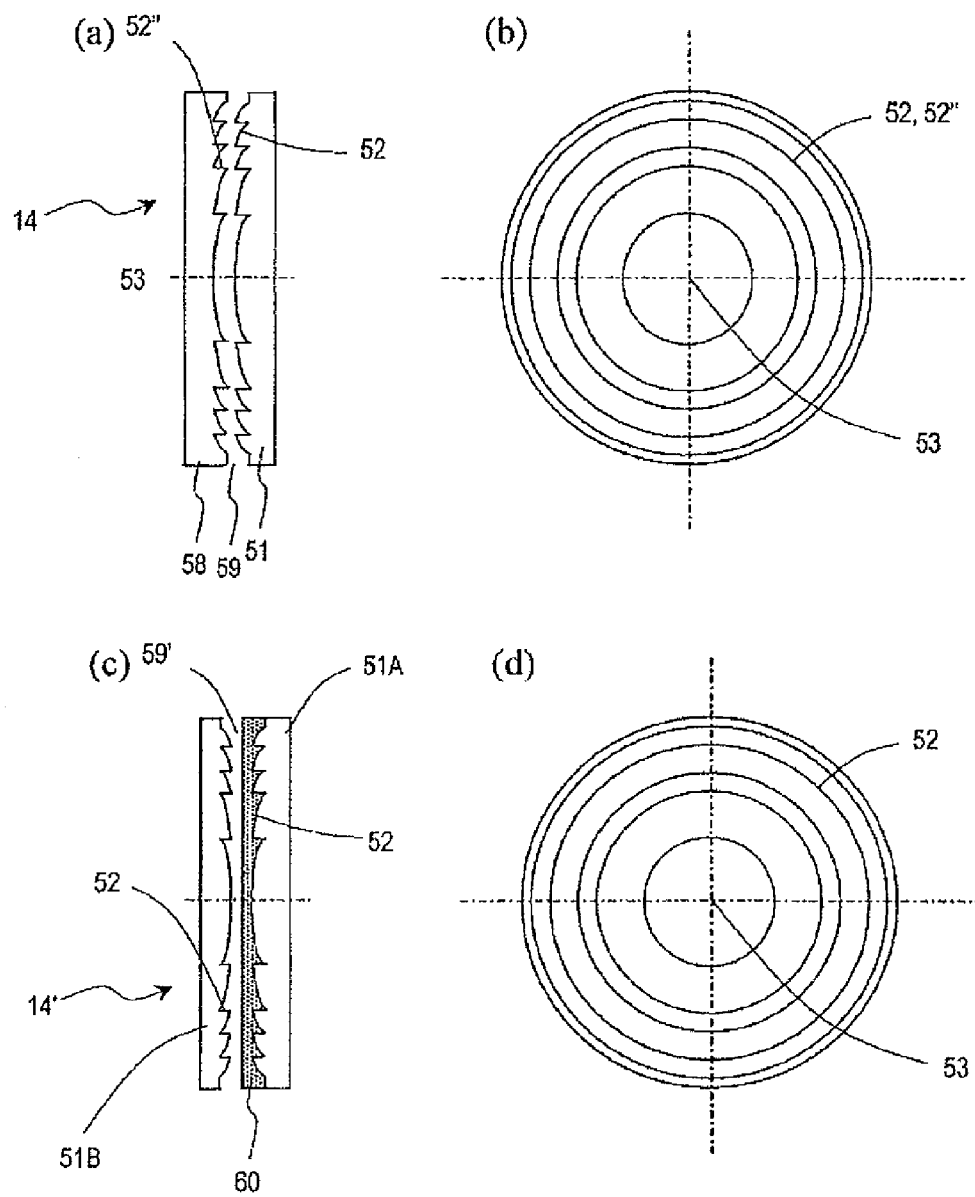
[FIG. 20] (a) and (b) are diagrams describing an optical element according to Embodiment 6 of the present invention; and (c) and (d) are diagrams describing an optical element according to Embodiment 7 of the present invention.
Figure 21:
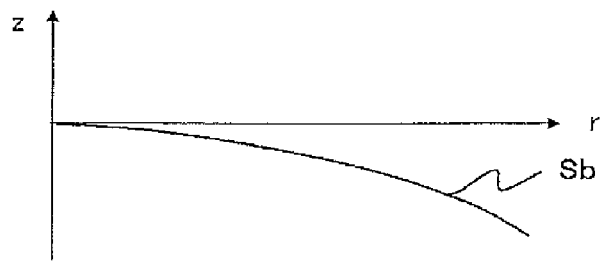
[FIG. 21] (a) to (c) are diagrams describing a method of deriving the shape of a diffraction grating plane of a conventional diffraction grating lens.
Figure 21:
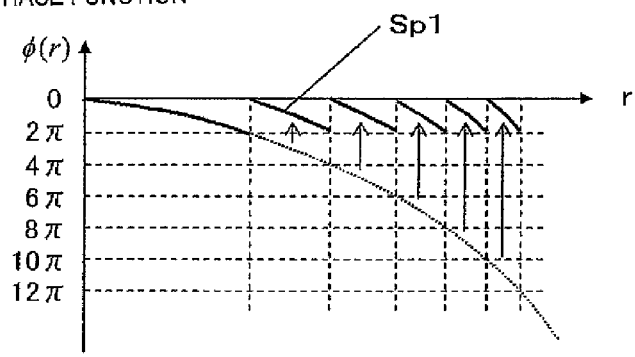
Figure 21:
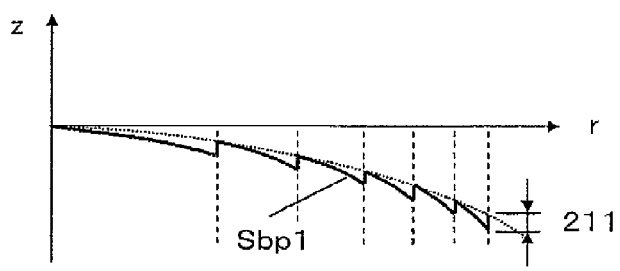
Figure 22:
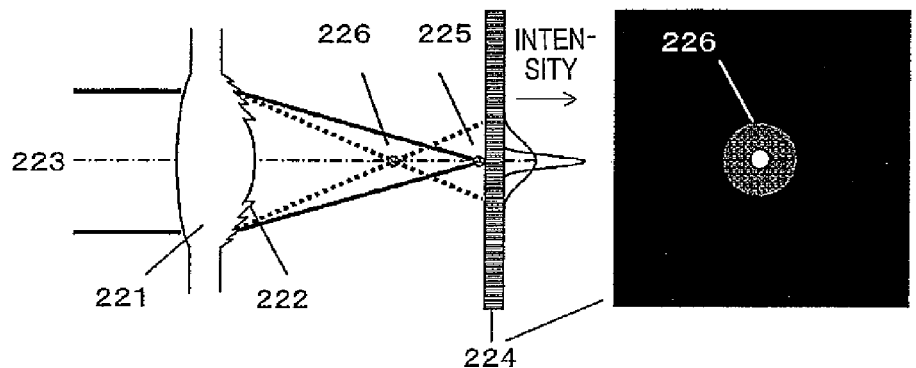
[FIG. 22] FIG. 22 A diagram showing how unwanted diffracted light may occur in a conventional diffraction grating lens.
Figure 23:
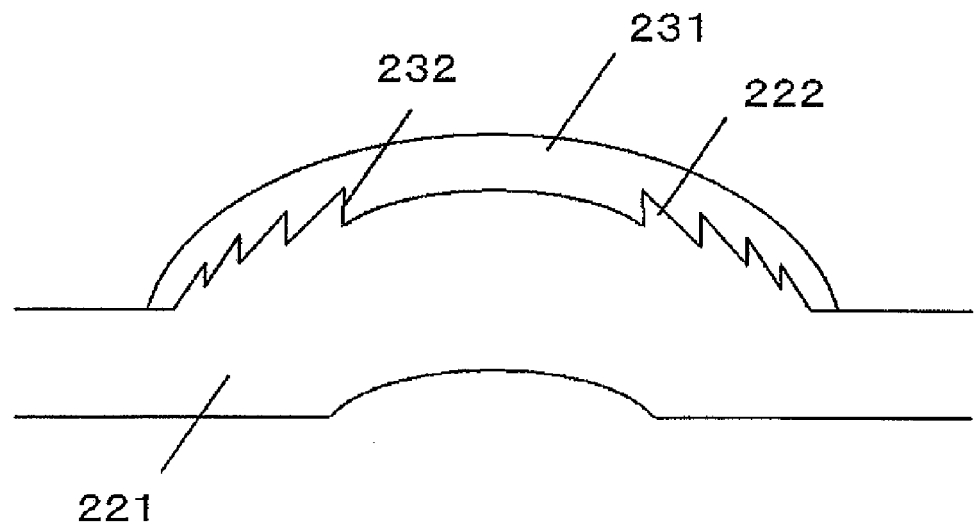
[FIG. 23] FIG. 23 A cross-sectional view of a conventional diffraction grating lens having an optical adjustment layer formed thereon.

FIG. 20(*a*) is a schematic cross-sectional view showing another embodiment of an optical element according to the present invention, and FIG. 20(*b*) is a plan view thereof. The optical element of the present embodiment includes two diffraction grating lenses. In FIG. 20(*a*), the left diffraction grating lens includes a lens body 58 and a diffraction grating 52" provided on one face of the lens body. Similarly, the right diffraction grating lens includes a lens body 51 and a diffraction grating 52 provided on one face of the lens body. The diffraction grating 52 and the diffraction grating 52" have corresponding shapes, which are designed based on the same phase difference function, for example. The lens body 51 and the lens body 58 are retained via a predetermined gap 59.

Similarly to Embodiment 1, each annular zone of the diffraction grating 52 of the lens body 51 is light-transmissive across its entire area along the width direction. In each annular zone, the light transmittance near at least one of both ends along the width direction is smaller than the light transmittance near a central portion along the width direction. As a result, the wavefront of light traveling through each annular zone has its light intensity decreased near the contour, whereby the intensity of light caused by a bending-around of the wavefront also decreases. As a result, the amount of occurrence of stripe flare light can be reduced.

Although only the lens body 51 is provided with a construction for reducing transparency in the present embodiment, the lens body 52 may be provided with a similar construction. Both of the lens body 51 and the lens body 52 may be provided a similar construction.

(Embodiment 7)

FIG. 20(*c*) is a schematic cross-sectional view showing another embodiment of an optical element according to the present invention, and FIG. 20(*d*) is a plan view thereof. The optical element of the present embodiment includes two diffraction grating lenses. In FIG. 20(*c*), the left diffraction grating lens includes a lens body 51B and a diffraction grating 52 provided on one face of the lens body 51B. The right diffraction grating lens includes a lens body 51A, a diffraction grating 52 provided on one face of the lens body 51A, and an optical adjustment layer 60 covering the diffraction grating 52. The lens body 51A and the lens body 51B are retained in such a manner that a gap 59' is created between the diffraction grating 52 that is provided on the surface of the lens body 51B and the optical adjustment layer 60.

Similarly to Embodiment 2, each annular zone of the diffraction grating 52 on the lens body 51A is light-transmissive across its entire area along the width direction. In each annular zone, the light transmittance near at least one of both ends along the width direction is smaller than the light transmittance near a central portion along the width direction. In the optical element of the present embodiment, the light intensity near the contour decreases at the wavefront of light traveling through each annular zone, whereby the intensity of light caused by a bending-around of the wavefront also decreases. As a result, the amount of occurrence of stripe flare light can be reduced.

Although only the lens body 51A is provided with a construction for reducing transparency in the present embodiment, the lens body 51B may be provided with a similar construction. Both of the lens body 51A and the lens body 51B may be provided with a similar construction.

Industrial Applicability

A diffraction grating lens according to the present invention and an imaging device in which the same is used are able to reduce stripe flare light, and therefore are particularly useful as imaging optics and as an imaging device in which the same is used.

| REFERENCE SIGNS LIST | |
|---|---|
| 11 | diffraction grating lens |
| 53 | optical adjustment layer |
| 61 | annular zone |
| 63 | slope |
| 65 | step surface |
| 66 | edge |
| 67 | foot |
| 68 | light transmittance adjustment film |
| 92 | diaphragm |
| 101 | mold |
| 102 | paint |
| 111 | ink chamber |
| 222 | diffraction grating |
| 223 | optical axis |
| 224 | imaging element |

The invention claimed is:

1. A diffraction grating lens comprising:
   a lens body; and
   a diffraction grating provided on a surface of the lens body, the diffraction grating including a plurality of annular zones having slopes inclined along a width direction and a plurality of step surfaces respectively located between the plurality of annular zones, wherein
   at least one of the plurality of annular zones extends from a first one of the step surfaces to a second one of the step surfaces and is light-transmissive across an entire area thereof along a width direction, and in the at least one annular zone from the first one of the step surfaces to the second one of the step surfaces, a light transmittance near at least one of two ends along the width direction is smaller than a light transmittance near a central portion along the width direction; and
   in the at least one annular zone, a surface roughness of the slope near at least one of the two ends along the width direction is greater than a surface roughness of the slope near the central portion along the width direction of the annular zone.

2. The diffraction grating lens of claim 1, wherein, in the at least one annular zone, out of the two ends along the width direction, light transmittance near at least the end at an edge of the slope is smaller than a light transmittance at the central portion along the width direction.

3. The diffraction grating lens of claim 2, wherein,
the at least one annular zone includes a light transmittance adjustment film disposed on the slope near at least one of the two ends along the width direction; and
a light transmittance of the light transmittance adjustment film is smaller than a light transmittance of a material of the lens body.

4. The diffraction grating lens of claim 3, wherein, near at least one of the two ends along the width direction of the at least one annular zone, the light transmittance adjustment film is disposed with a predetermined areal density.

5. The diffraction grating lens of claim 2, wherein, in the at least one annular zone, a light transmittance of the lens body near at least one of the two ends along the width direction is smaller than a light transmittance of the lens body near the central portion along the width direction of the annular zone.

6. The diffraction grating lens of claims 1, wherein, near at least one of the two ends along the width direction of the at least one annular zone, the light transmittance of the annular zone gradually decreases from the central portion along the width direction toward the at least one end.

7. The diffraction grating lens of claims 1, wherein, near at least one of the two ends along the width direction of the at least one annular zone, the light transmittance of the annular zone decreases in a stepwise manner from the central portion along the width direction toward the at least one end.

8. The diffraction grating lens of claims 1, wherein, the lens body is composed of a first material having a refractive index $n_1(\lambda)$ at a used wavelength $\lambda$; and
each of the plurality of step surfaces has a height d substantially satisfying the following equation, where n is a positive integer and m is an order of diffraction, $$d = \frac{m \cdot \lambda}{n_1(\lambda) - 1}. \qquad [\text{math. 1}]$$

9. The diffraction grating lens of claims 1, further comprising an optical adjustment layer provided on the lens body so as to cover the diffraction grating, wherein,
the lens body is composed of a first material having a refractive index $n_i(\lambda)$ at a used wavelength $\lambda$;
the optical adjustment film is composed of a second material having a refractive index $n_2(\lambda)$ at the used wavelength $\lambda$; and
each of the plurality of step surfaces has a height d substantially satisfying the following equation, where n is a positive integer and m is an order of diffraction, $$d = \frac{m \cdot \lambda}{n_1(\lambda) - n_2(\lambda)}. \qquad [\text{math. 2}]$$

10. An imaging device comprising:
a diffraction grating lens of claims 1; and
an imaging element for capturing a subject image which is formed by the diffraction grating lens and converting the subject image into an electrical signal.

11. A method of producing a diffraction grating lens having a lens body, and
a diffraction grating provided on a surface of the lens body, the diffraction grating including a plurality of annular zones having slopes inclined along a width direction and a plurality of step surfaces respectively located between the plurality of annular zones, wherein
at least one of the plurality of annular zones extends from a first one of the step surfaces to a second one of the step surfaces and is light-transmissive across an entire area thereof along a width direction, and in the at least one annular zone from the first one of the step surfaces to the second one of the step surfaces, a light transmittance near at least one of two ends along the width direction is smaller than a light transmittance near a central portion along the width direction; and
in the at least one annular zone, a surface roughness of the slope near at least one of the two ends along the width direction is greater than a surface roughness of the slope near the central portion along the width direction of the annular zone,
the method comprising:
a step of proving a lens body having the diffraction grating on a surface thereof; and
a step of pressing a mold against the diffraction grating on the surface of the lens body, with a material having a lower light transmittance than that of the lens body being applied on the mold.

* * * * *